United States Patent
Sueoka et al.

(10) Patent No.: US 7,531,119 B2
(45) Date of Patent: May 12, 2009

(54) METHOD OF MANUFACTURING BOOT FOR CONSTANT-VELOCITY UNIVERSAL JOINT AND MANUFACTURING APPARATUS FOR USE IN THE METHOD, AND BOOT FOR CONSTANT-VELOCITY UNIVERSAL JOINT

(75) Inventors: Kazuhiko Sueoka, Ageo (JP); Yasuji Takada, Ageo (JP)

(73) Assignee: Fukoku Co., Ltd., Ageo-shi, Saitama-ken (JP)

( * ) Notice: Subject to any disclaimer, the term of this patent is extended or adjusted under 35 U.S.C. 154(b) by 639 days.

(21) Appl. No.: 10/920,276

(22) Filed: Aug. 18, 2004

(65) Prior Publication Data
US 2005/0046078 A1    Mar. 3, 2005

(30) Foreign Application Priority Data
Aug. 29, 2003   (JP)   ............... 2003-209846
Apr. 27, 2004   (JP)   ............... 2004-131960

(51) Int. Cl.
    *B29C 45/14*   (2006.01)
(52) U.S. Cl. .................. 264/266; 264/275; 264/276
(58) Field of Classification Search ............... 264/266, 264/255, 328.8, 275, 276
    See application file for complete search history.

(56) References Cited

U.S. PATENT DOCUMENTS

| | | | |
|---|---|---|---|
| 4,752,208 A * | 6/1988 | Iwata et al. ................. | 425/577 |
| 4,856,795 A * | 8/1989 | DeLano et al. .............. | 277/635 |
| 5,529,538 A | 6/1996 | Schulz et al. | |
| 5,683,647 A * | 11/1997 | Kawasaki et al. ........... | 264/513 |
| 6,041,824 A * | 3/2000 | Powell ....................... | 138/109 |
| 6,402,999 B1 * | 6/2002 | Sadr et al. .................. | 264/68 |
| 6,537,484 B2 * | 3/2003 | Nakagawa et al. .......... | 264/513 |
| 6,838,041 B2 * | 1/2005 | Rowley ...................... | 264/506 |

FOREIGN PATENT DOCUMENTS

| JP | 2-22463 | 2/1990 |
|---|---|---|
| JP | 2002-286048 | 10/2002 |

* cited by examiner

*Primary Examiner*—Jill L Heitbrink
(74) *Attorney, Agent, or Firm*—Jacobson Holman PLLC

(57) ABSTRACT

There is disclosed a boot for a constant-velocity universal joint, in which a secondary molded portion including a thick portion is formed on an inner peripheral portion of a large-diameter side end portion formed as a primary molded member and in which a material in secondary molding is prevented from leaking. A manufacturing method includes: a step of forming a secondary molding space between a large-diameter side end portion inner peripheral surface of the primary molded member and an outer peripheral surface of a core mold; and a step of injecting a molten material into the secondary molding space to mold the secondary molded portion. The step of molding the secondary molded portion includes the steps of: applying a pressure of the molten material injected into the secondary molding space to a tapered surface 27 extending toward the large-diameter side end portion from a small-diameter portion 7b just in the vicinity of a large-diameter side end portion 3, expanding the tapered surface toward the small-diameter portion, and pressure-welding the small-diameter portion 7b held between the inner peripheral surface of a divided mold 51 and the outer peripheral surface of a core mold 69 onto the core mold outer peripheral surface.

15 Claims, 12 Drawing Sheets

METHOD OF MANUFACTURING BOOT FOR CONSTANT-VELOCITY UNIVERSAL JOINT AND MANUFACTURING APPARATUS FOR USE IN THE METHOD, AND BOOT FOR CONSTANT-VELOCITY UNIVERSAL JOINT

BACKGROUND OF THE INVENTION

1. Field of the Invention

The present invention relates to a boot for a constant-velocity universal joint including a large-diameter side end portion attached to an outer peripheral surface of a tripod joint whose outer peripheral surface is formed to be concave and in which a plurality of axial-direction grooves are formed among constant-velocity universal joints for use, for example, in driving shafts for transmitting powers to hubs to which tires are attached from differential gears connected to engines of cars.

2. Description of the Related Art

Constant-velocity universal joints are used, for example, in opposite end portions of a drive shaft for a car. Moreover, a flexible boot is attached to cover a bent portion of the constant-velocity universal joint in order to seal grease for lubricating the constant-velocity universal joint and to prevent invasion of foreign matters such as dust and water from the outside. A large-diameter side end portion and a small-diameter side end portion of the boot are usually fastened to the outer peripheral surface of a casing of the constant-velocity universal joint on a differential gear side or a hub side and the outer peripheral surface of a shaft portion of the driving shaft by bands to fix the boot.

Moreover, in the constant-velocity universal joint on the differential side (inboard side), a tripod joint is generally used in which, for example, three sets of rollers attached to the shaft portion of the driving shaft in a trifurcate state are constituted to be slidable in an axial direction. In the outer peripheral surface of the casing of the tripod joint, groove-like concave portions extending in the axial direction are formed, for example, in three places scattered in a peripheral direction for thinning and lightening of the joint. In this case, in the inner peripheral surface of the large-diameter side end portion of the boot for the constant-velocity universal joint, a thick portion is formed in a circularly protruded shape as viewed in the axial direction in accordance with the surface of the concave portion (see U.S. Pat. No. 5,529,538, for example).

In the boot for the constant-velocity universal joint, which has heretofore been used in the tripod joint, for example, it is known that bellows are formed of resin, for example, by injection blow molding, and an annular grommet including a thick portion protruding in an inner-diameter direction is fitted into the inner peripheral surface along which the inner diameter of the large-diameter side end portion of the resin bellows is formed to be constant (see U.S. Pat. No. 5,529,538, for example).

In the boot for the constant-velocity universal joint, the casing of the tripod joint is inserted into an inner periphery of the grommet, and an outer periphery of the casing of the tripod joint is fastened by a fastening tool such as a band from an outer peripheral side of the large-diameter side end portion to attach the joint.

It is also known that the resin grommet including thick portions formed to protrude at each certain interval in the inner-diameter direction is molded beforehand, the grommet is held in a mold, and thereafter the resin bellows are injection-molded or blow-mold to integrate the grommet and bellows in the mold (see Japanese Utility Model Application Laid-Open No. 2-22463 and Japanese Patent Application Laid-Open No. 2002-286048, for example).

However, when the bellows and the grommet are separately molded, and fitted/assembled into each other as in a constitution described in U.S. Pat. No. 5,529,538, and when the grommet is fitted into the inner periphery of the bellows large-diameter side end portion, the bellows and the grommet shift from each other unless a fitting operation is carefully performed. Since the shifting causes grease leakage, an assembly operation becomes intricate in order to prevent the shifting.

Moreover, after attaching the grommet to the outer periphery of the tripod joint, the large-diameter side end portion of the bellows may also be attached from the outside. Even in this case, unless the operation is carefully performed, the bellows large-diameter side end portion and the grommet shift from each other, and there is a possibility that the grease leaks.

Furthermore, in the prior art described in Japanese Utility Model Application Laid-Open No. 2-22463 or Japanese Patent Application Laid-Open No. 2002-286048, any special technical means is applied to a place where the grommet and bellows are integrated. Therefore, even when they are apparently integrated, they are not firmly fusion-bonded to each other, the apparently integrated place peels, and, as a result, a disadvantage such as a grease leakage is caused.

To solve the problem, the present inventors have succeeded in development of a newly useful method in which a secondary molded member including thick portions formed in accordance with the grooves in the outer peripheral surface of the tripod joint is formed on an inner peripheral portion of the large-diameter side end portion molded beforehand integrally with a bellows portion and small-diameter side end portion in primary molding. Moreover, it is demanded that in the secondary molding, a secondary molding material injected in a secondary molding space portion formed between a large-diameter side end portion inner peripheral surface of the primary molded member and a core mold outer peripheral surface, between a mold inner peripheral surface and a large-diameter side end portion outer peripheral surface of the primary molded member, or between the core mold outer peripheral surface and the mold inner peripheral surface via the inner/outer peripheral surface of the large-diameter side end portion of the primary molded member at the secondary molding time should enter the secondary molding space formed between the primary molded member and the core mold or mold to prevent the material from leaking from a desired sealed position.

SUMMARY OF THE INVENTION

The present invention has been developed to solve problems of related arts, and an object thereof is to prevent a material in secondary molding from leaking in a boot for a constant-velocity universal joint, in which a secondary molded portion including a thick portion is formed on an inner peripheral portion of a large-diameter side end portion formed as a primary molded member.

Technical means developed by the present invention to achieve the above-described object is a method of manufacturing a boot for a constant-velocity universal joint, including a large-diameter side end portion into which a casing of a tripod joint including a plurality of concave portions in an outer peripheral surface is inserted, a small-diameter side end portion into which a shaft portion connected to the tripod joint is inserted, and a bellows portion formed between the large-diameter side end portion and the small-diameter side end portion and constituted of repeatedly arranged large-diameter portions and small-diameter portions, the large-diameter side end portion including an inner peripheral surface constituted of a plurality of thick portions adapted to the concave portions of the casing of the tripod joint and protruded on an inner-diameter side and a plurality of thin portions arranged between the thick portions, the method comprising the steps of: holding a primary molded member molded including the small-diameter side end portion and the large-diameter side end portion on opposite ends communicating with an inner space of the bellows portion in a mold, and disposing a core mold in the large-diameter side end portion to form a secondary molding space constituted of a thick portion molding space and a thin portion molding space between a large-diameter side end portion inner peripheral surface of the primary molded member and a core mold outer peripheral surface, between a mold inner peripheral surface and the large-diameter side end portion outer peripheral surface of the primary molded member, or between the core mold outer peripheral surface and the mold inner peripheral surface via the inner/outer peripheral surface of the large-diameter side end portion of the primary molded member; and positioning a molten material injection point for secondary molding in one or a plurality of optional places in the secondary molding space, and injecting a molten material into the secondary molding space via the injection point to mold a secondary molded portion on the large-diameter side end portion of the primary molded member, the step of molding the secondary molded portion comprising the steps of: applying a pressure of the molten material injected into the secondary molding space to a tapered surface extending toward the large-diameter side end portion from the small-diameter portion just in the vicinity of the large-diameter side end portion held between the mold inner peripheral surface and the core mold outer peripheral surface; expanding the tapered surface compressed by the injection pressure of the molten material toward the small-diameter portion; and pressure-contacting the small-diameter portion held between the mold inner peripheral surface and the core mold outer peripheral surface onto either one or both of the core mold outer peripheral surface and the mold inner peripheral surface by the expanding of the tapered surface.

In this case, the small-diameter portion is held between a protrusion of the mold fitted on the side of the small-diameter portion outer surface just in the vicinity of the large-diameter side end portion and a concave peripheral groove of the core mold outer peripheral surface into which the small-diameter side portion inner surface is fitted.

Moreover, according to the present invention, a resin injected into the secondary molding space presses the tapered surface extending to the large-diameter side end portion from the small-diameter portion before reaching a sealed portion between the mold inner peripheral surface and the core mold outer peripheral surface, and compresses a primary molding material in the vicinity of the tapered surface to generate a stress for expansion in an in-plane direction. Accordingly, the small-diameter portion is pressed onto the outer peripheral surface of the core mold, the inner peripheral surface of the mold, or both the outer peripheral surface of the core mold and the inner peripheral surface of the mold, a so-called self-sealing effect is produced, and the material in the secondary molding can be prevented from leaking.

Furthermore, in this case, in the step of molding the secondary molded portion, a direction $\theta$ of an injection gate is set to $0° \leq \theta \leq 90°$ with respect to either or both of the inner peripheral surface and the outer peripheral surface of the large-diameter side end portion of the primary molded member.

Moreover, assuming that a distance between the inner peripheral surface or the outer peripheral surface of the large-diameter side end portion of the primary molded member and an injection gate center is t and that a diametric direction distance of an injection-side end portion of the secondary molding space is a, a position of the injection gate is set to $0 \leq t \leq 2a/3$, the molten material is injected so as to bring the molten material into sliding contact with either or both of the inner peripheral surface and the outer peripheral surface of the large-diameter side end portion of the primary molded member, and the molten material may be charged into the secondary molding space.

Accordingly, impurities on the inner peripheral surface or the outer peripheral surface of the large-diameter side end portion of the bellows portion are pushed away, heat of the molten material is transferred to the inner peripheral surface or the outer peripheral surface of the large-diameter side end portion of the bellows portion, and the inner peripheral surface or the outer peripheral surface is fused. Therefore, the inner peripheral surface or the outer peripheral surface of the large-diameter side end portion of the bellows portion is fusion-bonded to the molten material injected into the secondary molding space, and completely integrated.

Furthermore, one or two pins are inserted/disposed at an interval in the thick portion molding space in the secondary molding space, and thereafter the molten material is injected to form one or two holes in the thick portion.

Accordingly, since a volume of the thick portion is reduced, a cooling time of the thin portion can closely match or resemble that of the thick portion. Furthermore, since turbulence occurrence at a time when the molten resin flows through the thick portion molding space is remarkably little, weld or air entrainment does not occur.

Examples of an apparatus for use in the method of manufacturing the boot for the constant-velocity universal joint include the following apparatus, whereby the function/effect according to the manufacturing method can be obtained.

There is provided an apparatus for manufacturing a boot for a constant-velocity universal joint, including a large-diameter side end portion into which a casing of a tripod joint having a plurality of concave portions in an outer peripheral surface is inserted, a small-diameter side end portion into which a shaft portion connected to the tripod joint is inserted, and a bellows portion formed between the large-diameter side end portion and the small-diameter side end portion and constituted of repeatedly arranged large-diameter portions and small-diameter portions, the large-diameter side end portion including an inner peripheral surface constituted of a plurality of thick portions adapted to the concave portions of the casing of the tripod joint and protruded on an inner-diameter side and thin portions arranged between the plurality of thick portions, the apparatus comprising: divided molds which hold an outer surface of the primary molded member; a core mold inserted into the inner-diameter side of the large-diameter side end portion of the primary molded member held by the divided molds; and an injection mechanism which injects/charges a molten material into a secondary molding space constituted of a thick portion molding space and a thin portion molding space formed between a large-diameter side end portion inner peripheral surface of the primary molded member and a core mold outer peripheral surface, between a mold inner peripheral surface and the large-diameter side end portion outer peripheral surface of the primary molded member, or between the core mold outer peripheral surface and the mold inner peripheral surface via the inner/outer peripheral surface of the large-diameter side end portion of the primary molded member; the core mold including a concave peripheral groove in the outer peripheral surface to hold the small-diameter portion just in the vicinity of the large-diameter side end portion between the mold inner peripheral surface and the peripheral groove, the peripheral groove including a peripheral edge on a molten material injection side positioned on a tapered surface extending toward the large-diameter side end portion from the small-diameter portion just in the vicinity of the large-diameter side end portion in the bellows portion to hold the tapered surface between the mold inner peripheral surface and the peripheral groove; the injection mechanism being constituted so as to dispose a molten material injection point in one or a plurality of optional places in the secondary molding space.

There is also provided an apparatus for manufacturing a boot for a constant-velocity universal joint, wherein a direction θ of an injection gate is set to $0° \leqq \theta \leqq 90°$ with respect to either or both of the inner peripheral surface and the outer peripheral surface of the large-diameter side end portion of the bellows portion, assuming that a distance between the inner peripheral surface or the outer peripheral surface of the large-diameter side end portion of the bellows portion and an injection gate center is t and that a diametric direction distance of an injection-side end portion of the secondary molding space is a, a position of the injection gate is set to $0 \leqq t \leqq 2a/3$, the molten material is injected so as to bring the molten material into sliding contact with either or both of the inner peripheral surface and the outer peripheral surface of the large-diameter side end portion of the bellows portion, and the molten material is charged into the secondary molding space.

There is further provided an apparatus for manufacturing a boot for a constant-velocity universal joint, wherein, in each of the apparatuses for manufacturing, one or two pins are inserted/disposed at an interval in the thick portion molding space constituting the secondary molding space, and thereafter the molten material is injected to form one or two holes in the thick portion.

There is also provided a boot for a constant-velocity universal joint by the use of each of the manufacturing apparatuses.

There is further provided a boot for a constant-velocity universal joint, including a large-diameter side end portion into which a casing of a tripod joint including a plurality of concave portions in an outer peripheral surface is inserted, a small-diameter side end portion into which a shaft portion connected to the tripod joint is inserted, and a bellows portion formed between the large-diameter side end portion and the small-diameter side end portion and constituted of repeatedly arranged large-diameter portions and small-diameter portions, the large-diameter side end portion including an inner peripheral surface constituted of a plurality of thick portions adapted to the concave portions of the casing of the tripod joint and protruded on an inner-diameter side and thin portions arranged between the plurality of thick portions, the boot comprising: a secondary molded portion which is molded by injecting a molten material into either or both of the inner peripheral surface and the outer peripheral surface of the large-diameter side end portion of the primary molded member molded including the small-diameter side end portion and the large-diameter side end portion on opposite ends communicating with an inner space of the bellows portion; the small-diameter portion just in the vicinity of the large-diameter side end portion being held between a concave portion of a core mold disposed in the inner surface and a convex portion of a mold disposed in the outer surface when the secondary molded portion is injection molded; either or both of the core mold and the mold forming a portion of a space for injecting the molten material.

According to the present invention, the boot for the constant-velocity universal joint is manufactured in which a secondary molded member including portions having different thicknesses is formed on an inner peripheral portion of a large-diameter side end portion formed beforehand as a primary molded member.

DESCRIPTION OF THE PREFERRED EMBODIMENT

An embodiment of a method of manufacturing a boot for a constant-velocity universal joint, to which the present invention is applied, and a manufacturing apparatus for use in the manufacturing method will be described. It is to be noted that the present embodiment is only an embodiment of the present invention, interpretation is not limited to the embodiment, and the embodiment can be appropriately designed/changed in the scope of the present invention.

Figure 1:
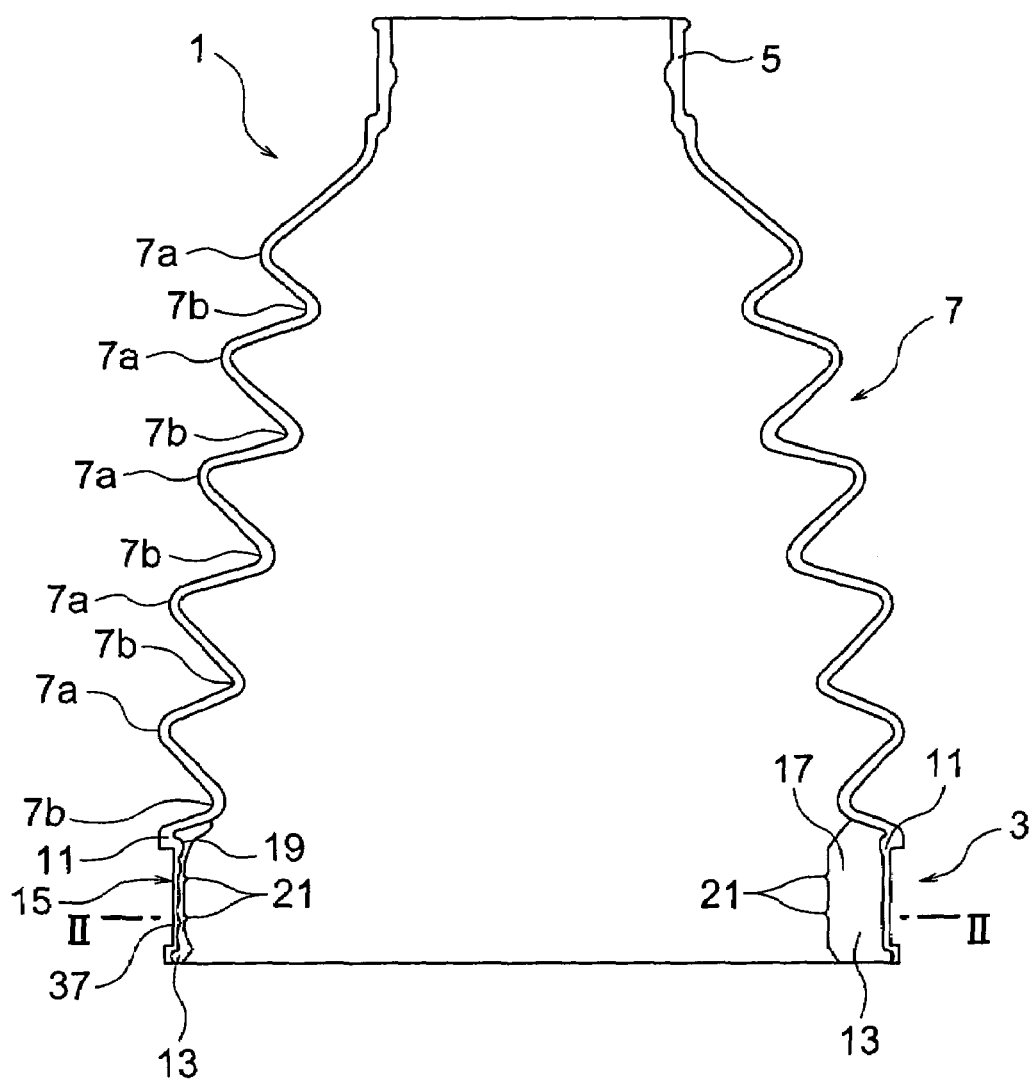
FIG. 1 is a vertical sectional view showing an embodiment of a boot for a constant-velocity universal joint, manufactured according to the present invention.

FIG. 1 is a vertical sectional view showing an embodiment of a boot for a constant-velocity universal joint, manufactured by the manufacturing method and apparatus of the present embodiment.

A boot for a constant-velocity universal joint 1 is used in a tripod joint in which a concave portion is formed in an outer peripheral surface of a casing. That is, for example, grooves formed in circular sectional shapes in an axial direction are formed in three places apart from one another at an equal interval in a peripheral direction of the outer peripheral surface in the casing of the tripod joint.

As shown in FIG. 1, the boot for the constant-velocity universal joint 1 includes a large-diameter side end portion 3 into which the casing of the tripod joint is inserted, and a small-diameter side end portion 5 whose inner and outer diameters are formed to be smaller than those of the large-diameter side end portion 3. In the small-diameter side end portion 5, a shaft portion of a driving shaft connected to the tripod joint is inserted. Moreover, a bellows portion 7 formed in a bellows state is disposed between the large-diameter side end portion 3 and the small-diameter side end portion 5.

Moreover, in the boot 1, the large-diameter side end portion 3, small-diameter side end portion 5, and bellows portion 7 are integrally molded by a known primary molding step using a resin such as thermoplastic elastomer (this molded member will be hereinafter referred to as a primary molded member). Furthermore, on an inner peripheral surface side of the large-diameter side end portion 3, a secondary molded member 13 is formed which is a portion having a different thickness, molded integrally with the primary molded member using thermoplastic elastomer or the like.

As shown in FIG. 1, the bellows portion 7 is constituted in such a manner that large-diameter portions (also referred to as the mountain portions) 7a formed to have large diameters and forming a convex outer part of the boot 1, and small-diameter portions (also referred to as the valley portions) 7b formed to have small diameters and forming a concave outer part of the boot 1 are repeatedly formed in a cylindrical axial direction of the boot 1. For example, in the present embodiment, the bellows portion includes five large-diameter portions 7a and five small-diameter portions 7b disposed on a large-diameter side end portion 3 side with respect to these five large-diameter portions 7a. These large-diameter portions 7a and small-diameter portions 7b are formed successively in larger diameters from the small-diameter side end portion 5 toward the large-diameter side end portion 3, and, as a result, the boot 1 is entirely formed substantially in a conical shape.

It is to be noted that in the present embodiment, the bellows portion 7 is not especially limited, and optimum conditions in the scope of the present invention are appropriately applied to conditions such as the thickness of the bellows portion 7 and pitches of the large-diameter portions 7a and small-diameter portions 7b.

Moreover, in the present embodiment, both the large-diameter side end portion 3 and the small-diameter side end portion 5 of the primary molded member are formed in desired uniform thicknesses. These thicknesses are not especially limited, and optimum optional thicknesses are selected.

The conditions of the large-diameter side end portion 3 and the small-diameter side end portion 5 are not especially limited, and the optimum conditions are appropriately applied in the scope of the present invention. It is to be noted that in the present embodiment, the thicknesses of the large-diameter side end portion 3 and small-diameter side end portion 5 are formed to be uniform, but non-uniform thicknesses are also included in the scope of the present invention.

Figure 2:
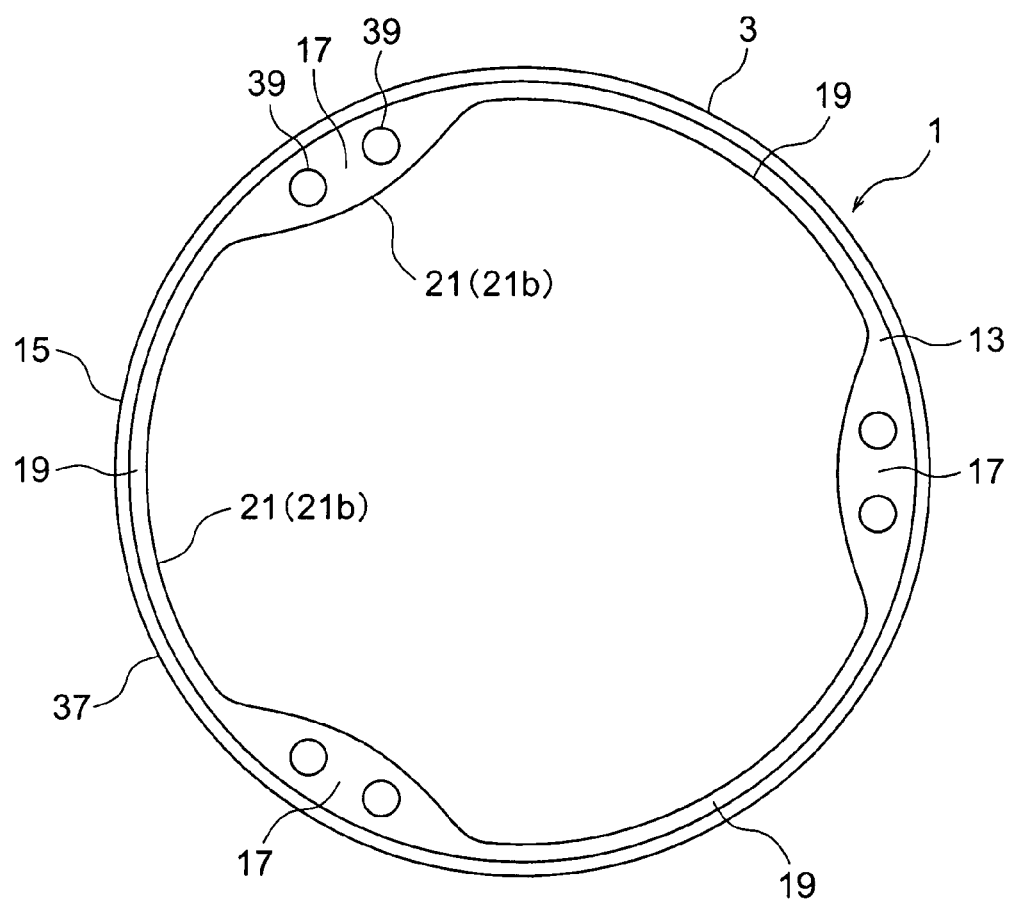
FIG. 2 is an end surface diagram of the boot for the constant-velocity universal joint along line II-II of FIG. 1.

FIG. 2 is an end surface diagram of the boot for the constant-velocity universal joint 1 along line II-II of FIG. 1. As shown in FIGS. 1 and 2, an outer peripheral surface 15 of the large-diameter side end portion 3 which is the primary molded member is formed substantially in a circular shape. A band fastening portion 37 for attaching the boot 1 to a tripod joint is disposed in a concave form in the outer peripheral surface 15. Moreover, in the secondary molded member 13 formed inside the outer peripheral surface 15, a plurality of thick portions 17 formed to protrude on the inner peripheral surface side, and a plurality of thin portions 19 formed between the thick portions 17 are disposed.

As shown in FIG. 2, the thick portions 17 are formed to protrude substantially in circular shapes as viewed in a section in the axial direction of the large-diameter side end portion 3, and have the same sectional shape over the axial direction of the boot 1. The shape of the thick portion 17 is set to be adapted to an ax-al direction groove in the outer peripheral surface of the casing of the tripod joint to which the boot 1 is attached. Moreover, in the present embodiment, for example, three thick portions 17 are formed at substantially equal intervals on the periphery. Three thin portions 19 each having a substantially constant thickness over a peripheral direction are formed among the thick portions 17.

Moreover, as shown in FIG. 1, in the inner peripheral surface of the large-diameter side end portion 3, for example, two parallel sealing lips 21 (21a, 21b) are disposed continuously in the peripheral direction over the surfaces of the thick portions 17 and thin portions 19. The sealing lips 21 are formed as protrusions whose sectional shapes are substantially triangular or trapezoidal, and in the present embodiment, and a top of the lip is R-chamfered.

It is to be noted that in the present embodiment, two sealing lips 21 (21a, 21b) are disposed, but the number of sealing lips, the shapes thereof and the like are not limited, one or three or more lips may also be disposed, and the lips may be appropriately designed/changed.

Figure 3:
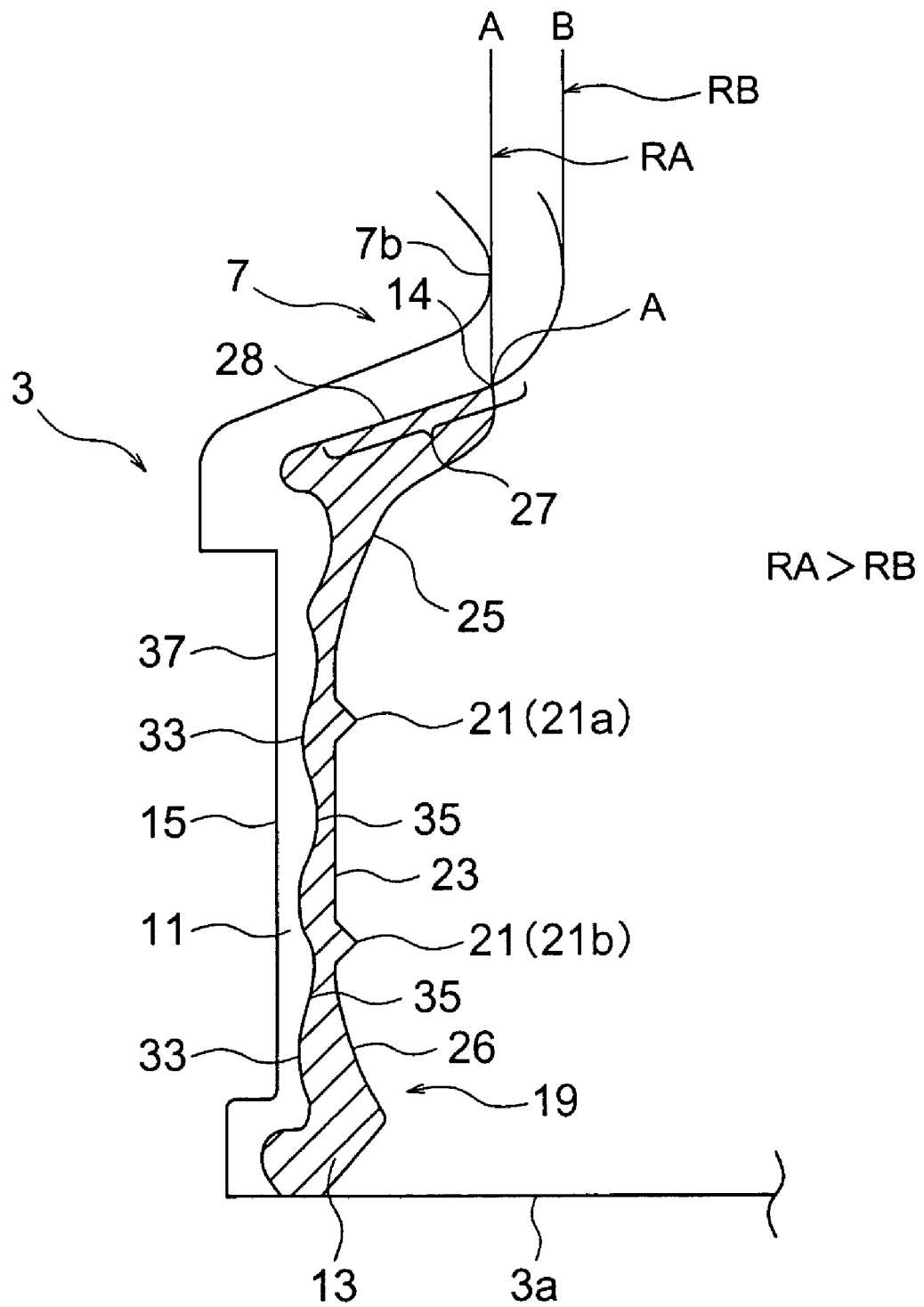
FIG. 3 is an enlarged sectional view of a thin portion of a large-diameter side end portion in the boot.
Figure 4:
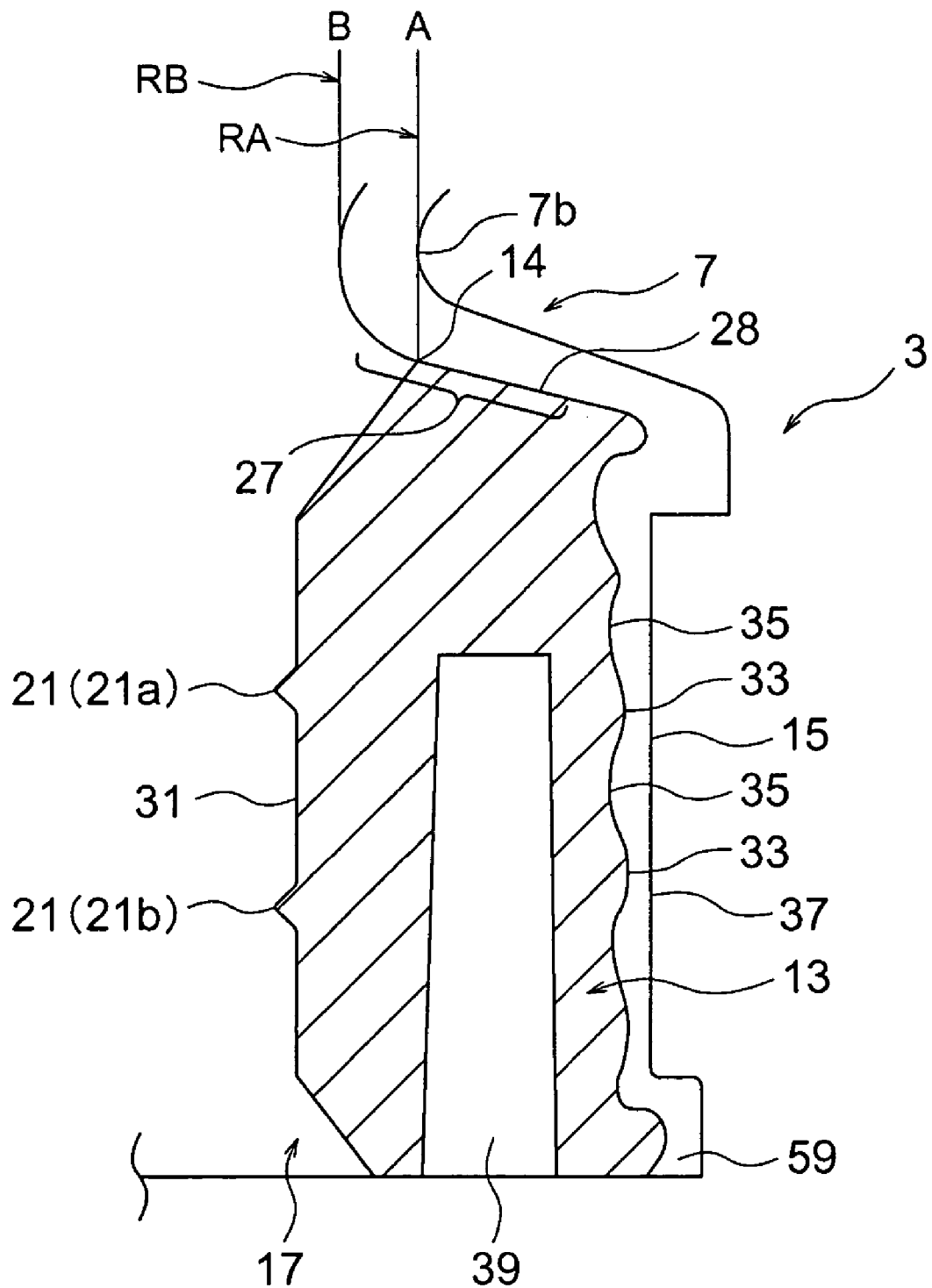
FIG. 4 is an enlarged sectional view of a thick portion of the large-diameter side end portion in the boot.

FIG. 3 is an enlarged sectional view of the thin portion in the large-diameter side end portion of the boot 1 shown in FIG. 1, and FIG. 4 is an enlarged sectional view of the thick portion in the large-diameter side end portion of the boot 1 shown in FIG. 1. As shown in FIGS. 3, 4, the inner peripheral surface of the secondary molded member 13 is formed substantially in a constant inner diameter along a cylinder axial direction of the large-diameter side end portion 3 in portions 23, 31 held between two sealing lips 21 (21a, 21b).

Moreover, an inner peripheral surface 25 of the secondary molded member 13 on the bellows portion 7 side in two sealing lips 21, that is, on the bellows portion 7 side with respect to the upper sealing lip 21 (21a) in FIG. 3 is formed in such a tapered shape that the inner diameter is gradually reduced toward the bellows portion 7.

Furthermore, an inner peripheral surface 26 in the vicinity of an end surface 3a of the large-diameter side end portion 3 with respect to the lower sealing lip 21 (21b) in FIG. 3 is formed in such a tapered shape that the inner diameter is gradually reduced toward the end surface 3a.

As shown in FIG. 3, a tapered surface 27 which is the inner surface of the bellows portion 7 extending toward the large-diameter side end portion 3 from the small-diameter portion 7b just in the vicinity of the large-diameter side end portion 3 is formed in such a tapered shape that the inner diameter is gradually enlarged toward the large-diameter side end portion 3, that is, downwards in FIG. 3.

The end portion of the secondary molded member 13 on the bellows portion 7 side is formed in layers along the tapered surface 27. Moreover, an end portion 14 of the secondary molded member 13 close to the small-diameter portion 7b just in the vicinity of the large-diameter side end portion 3 is disposed midway in the tapered surface 27, that is, brought into contact with an intermediate portion of the tapered surface 27 in a diametric direction. Therefore, as shown in FIG. 3, assuming that radii of a sealed portion A which is a minimum diameter portion of a bonding surface 28 between the secondary molded member 13 and bellows portion 7, and a place B where the inner diameter of the small-diameter portion 7b of the bellows portion 7 just in the vicinity of the large-diameter side end portion 3 is minimum from a center of the large-diameter side end portion 3 are RA, RB, a relation of RA>RB is obtained.

Moreover, as shown in FIG. 4, also in the thick portion 17, in the same manner as in the above-described thin portion 19, the end portion 14 of the secondary molded member 13 close to the small-diameter portion 7b just in the vicinity of the large-diameter side end portion 3 is disposed midway in the tapered surface 27, that is, brought into contact with the intermediate portion of the tapered surface 27 in the diametric direction. Therefore, as shown in FIG. 4, assuming that radii of the sealed portion A which is a minimum diameter portion of the bonding surface 28 between the secondary molded member 13 and bellows portion 7, and the place B where the inner diameter of the small-diameter portion 7b of the bellows portion 7 just in the vicinity of the large-diameter side end portion 3 is minimum from the center of the large-diameter side end portion 3 are RA, RB, a relation of RA>RB is obtained.

According to the present embodiment, to enhance adhesion of the inner peripheral surface of the large-diameter side end portion 3 with respect to the secondary molded member which is the portion having different thicknesses, concave portions 33 and convex portions 35 are alternately disposed in an end portion height direction of the inner peripheral surface to form the inner peripheral surface in a concave/convex shape.

Moreover, in the present embodiment, as shown in FIGS. 2 and 4, two non-through holes (concave portions) 39 are disposed in the axial direction of the thick portion 17, and this prevents air and weld defects. It is to be noted that one or two holes 39 are disposed in each thick portion 17. In the present embodiment, the holes 39 are disposed in all the thick portions 17, but any hole may not be disposed, or the holes may also be disposed in optionally selected thick portions. Further in the present embodiment, the hole has a perfectly circular sectional shape, and is formed in such a conical shape that the diameter is reduced in a depth direction (toward the small-diameter side end portion), but optional shapes such as elliptical sectional shape or a teardrop sectional shape can be selected, and the shape may be designed/changed in the scope of the present invention.

Thermoplastic resins constituting the primary molded member constituted of the large-diameter side end portion 3, small-diameter side end portion 5, and bellows portion 7, and the secondary molded member 13 constituted of the portion having different thicknesses are not especially limited, and optimum materials are selected in the scope of the present invention. The same material, materials different in hardness, or different materials are also included in the scope of the present invention. It is to be noted that the secondary molded member 13 which is the portion having different thicknesses is preferably formed of a material having a sealing function of preventing grease from leaking. On the other hand, the material of the primary molded member may be selected simply in accordance with an original purpose. That is, materials having flexibility, resistance to heat, resistance to coldness, and the like may be selected.

Next, an example of the manufacturing method and apparatus for manufacturing the boot for the constant-velocity universal joint 1 according to the present invention will be described.

It is to be noted that in Example 1, the following example will be described in which a secondary molding space 43 is formed in the inner peripheral surface of the large-diameter side end portion 3 of the primary molded member disposed between a mold 49 and a core mold 69 and the outer peripheral surface of the core mold (outer peripheral portion 75), and a molten material is injected into the secondary molding space 43 to integrally mold the secondary molded member which is the portion having different thicknesses. Example 2 is an example in which a secondary molding space 43c is formed between the outer peripheral surface 15 of the large-diameter side end portion 3 and a mold inner peripheral surface 50, a molten material is injected into the secondary molding space 43c to integrally mold the secondary molded member which is the portion having different thicknesses. Example 3 is an example in which secondary molding spaces 43d, 43e are formed between the core mold outer peripheral surface (outer peripheral portion 75) and the mold inner peripheral surface 50 via the inner/outer peripheral surface of the large-diameter side end portion 3, and a molten material is injected into the secondary molding spaces 43d, 43e to integrally mold the secondary molded member which is the portion having different thicknesses.

EXAMPLE 1

[Primary Molding Step]

As a method of molding the primary molded member constituted of the large-diameter side end portion 3, small-diameter side end portion 5, and bellows portion 7, blow molding, injection blow molding and the like are well known, but the method is not especially limited, and an optimum molding method is applied to the scope of the present invention.

[Secondary Molding Step]

In the present step, the primary molded member molded in the primary molding is held in a mold 49 for injection molding, a desired molten material is injected into the mold 49 at a high speed, and the secondary molded member 13 is integrally molded on the inner diameter side of the outer peripheral surface 15 of the large-diameter side end portion 3 of the primary molded member. It is to be noted that since a known constitution is applied to a constitution other than the constitution described later, description is omitted.

The secondary molding step includes (a) a step in which a secondary molding space is formed, and (b) a step in which a secondary molded portion is molded.

[(a) Step in Which the Secondary Molding Space is Formed]

Figure 5:
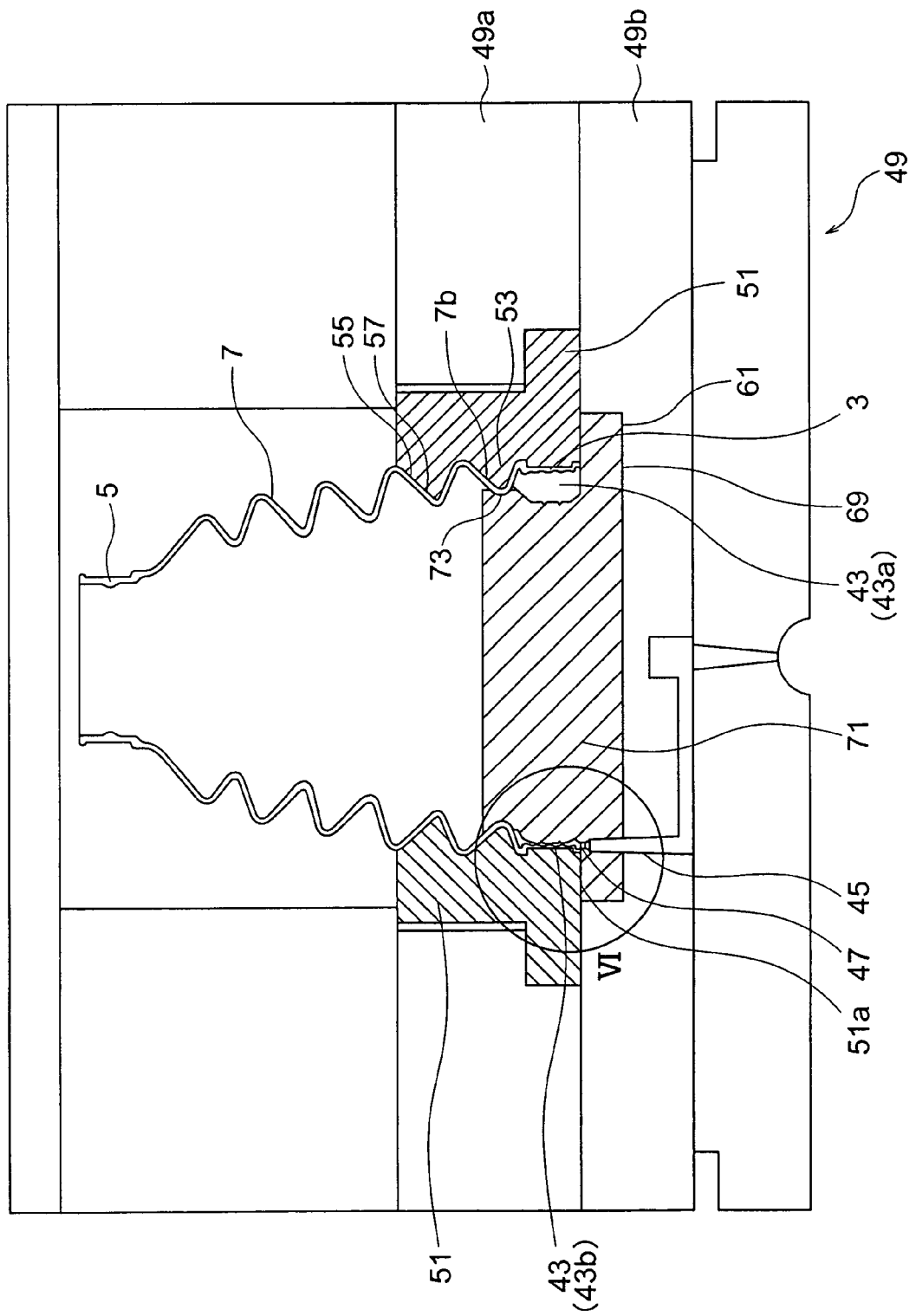
FIG. 5 is a schematic sectional view showing an example of a secondary molding step of the present embodiment.
Figure 6:
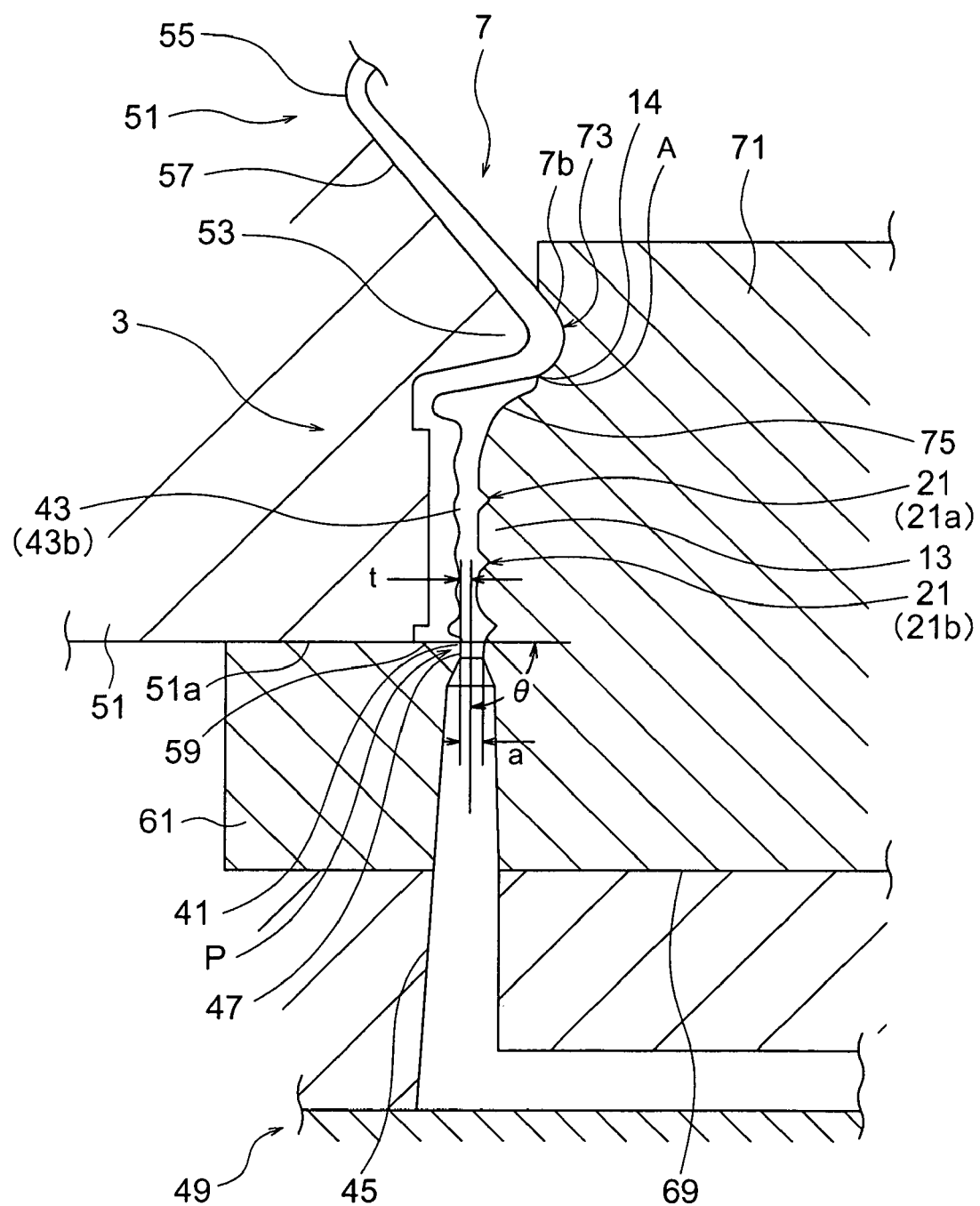
FIG. 6 is an enlarged sectional view of part VI of FIG. 5.

FIG. 5 is a sectional view of a main part of a manufacturing apparatus for the boot for the constant-velocity universal joint of the present example, for use in the secondary molding step. FIG. 6 is an enlarged sectional view of part VI of FIG. 5.

First, a schematic structure of the mold 49 which is the main part of the manufacturing apparatus for use in the present step will be described. As shown in FIG. 5, the mold 49 for the injection molding which is the main part of the present apparatus includes divided molds 51 constituting a movable board 49a side, and a core mold 69 disposed on a fixed board 49b side.

As shown in FIG. 5, an outline 57 to which an outer shape of the primary molded member is closely attached is formed on the inner surfaces of the divided molds 51. When the divided molds 51 are clamped, a primary molded member storage space 55 matching the outer shape (outer outline) of the boot 1 is formed.

The primary molded member storage space 55 is formed in such a manner that an opening edge 59 of the outer peripheral surface 15 of the large-diameter side end portion 3 of the primary molded member stored in the primary molded member storage space 55 at the time of the clamping of the molds is positioned in the same plane as that of a lower end surface 51a of the divided mold 51.

As shown in FIGS. 5 and 6, the core mold 69 is constituted of a substantially cylindrical core portion 71 to be fitted into the inner peripheral surface of the large-diameter side end portion 3 in the primary molded member, and a disc-shaped flange portion 61 extending in a horizontal direction from one end of the core portion 71.

In the core portion 71, as shown in FIG. 6, a concave peripheral groove 73 is formed in the outer periphery of the core portion just in the vicinity of one end opposite to the disc-shaped flange portion 61 in a core portion axial direction.

Moreover, in an outer peripheral portion 75 between the flange portion 61 and the concave peripheral groove 73 in the core portion 71, a portion is formed whose outer peripheral shape and outer diameter are determined in consideration of the outer peripheral shape and outer diameter of the casing of the tripod joint to which the boot 1 manufactured by the present example is attached.

In the disc-shaped flange portion 61, as shown in FIG. 6, a gate 47 is formed from which the thermoplastic resin is injected into the secondary molding space 43 described later via a runner 45. In the present example, for example, as shown in FIG. 5, the gate 47 is disposed in one or a plurality of optionally selected places of a thin portion molding space 43b.

That is, when a thermoplastic resin injection point P for the secondary molding is disposed in one or a plurality of optional places of the thin portion molding space 43b in the secondary molding space 43, the thin portion molding space 43b from the injection gate 47 to a thick portion molding space 43a also serves as a narrow runner. While a high-temperature state is maintained, the molten material is momentarily fed into the thick portion molding space 43a at a high speed/temperature, and therefore the air defect, welding defect and the like can be prevented from being caused.

Needless to say, the gate 47 may also be disposed in one or a plurality of optionally selected places of the thick portion molding space 43a, or in one or a plurality of optionally selected places including the thin portion molding space 43b and thick portion molding space 43a without any problem.

Next, an example of the present step performed using the above-described mold 49 will be described. For example, first the inner peripheral surface of the large-diameter side end portion 3 of the primary molded member is fitted into the outer peripheral surface of the core portion 71 of the core mold 69 disposed beforehand on the fixed board 49b side of the mold 49 with a gap from the outer peripheral surface of the core portion 71, and the primary molded member is attached to the core mold 69.

Moreover, next the primary molded member including the large-diameter side end portion 3 fitted into the outer peripheral surface of the core mold 69 as described above is disposed/held in the mold 49, when the divided molds 51 are clamped (state of FIG. 5).

When the divided molds 51 are clamped in this manner, a protrusion 53 of the inner surface of the divided mold 51 fits into the whole outer surface of the small-diameter portion 7b just in the vicinity of the large-diameter side end portion 3 of the bellows portion 7. The concave peripheral groove 73 formed in the concave shape in the outer peripheral surface of the tip of the core portion 71 of the core mold 69 fits into the whole inner surface of the small-diameter portion 7b, and the small-diameter portion 7b is held between the protrusion 53 of the divided mold 51 and the concave peripheral groove 73.

Through this step, as shown in FIG. 6, the sealed portion A is formed in the held portion of the small-diameter portion 7b, and the secondary molding space 43 for molding the secondary molded member 13 constituted of the thick portions 17 and thin portions 19 on the inner peripheral surface of the large-diameter side end portion 3 is formed between the inner peripheral surface of the large-diameter side end portion 3 of the primary molded member and the outer peripheral portion 75 of the core portion 71 of the core mold 69.

In the secondary molding space 43 of the present example, three concave portions are formed at constant intervals in the outer peripheral portion 75 of the core portion 71. Therefore, the thick portion molding space 43a is formed between the concave portion and the inner peripheral surface of the large-diameter side end portion 3, and the thin portion molding space 43b communicating with the thick portion molding space 43a is formed between the outer peripheral surface of the core portion 71 except the concave portion and the inner peripheral surface of the large-diameter side end portion 3.

It is to be noted that the above-described present step is only an example, and another step may also be used in the scope of the present invention, and the step may be appropriately designed/changed.

Moreover, when one or two holes 39 are disposed in the thick portion 17 as shown in FIGS. 2 and 4, protrusions (not shown) for forming the holes 39 are disposed at certain intervals in desired places (three places in the present example) of the flange portion 61. Accordingly, the holes 39 are simultaneously molded at the secondary molding time.

It is to be noted that the gate 47 is disposed in the thick portion molding space 43a so that the thermoplastic resin may be injected only from the thick portion molding space 43a or a plurality of places including the thick portion molding space 43a. However, from the standpoints of prevention of occurrence of the air defect and welding defect, the thin portion molding space 43b is preferably provided with the gate 47 as in the present example.

[(b) Step in Which the Secondary Molded Portion is Molded]

First, as shown in FIG. 6, the molten material injection point P for the secondary molding is positioned in one or a plurality of optional places of the thin portion molding space 43b in the secondary molding space 43 formed by the above-described step.

Moreover, the molten thermoplastic resin heated, for example, at a high temperature of 260° C. or more is injected into the secondary molding space 43 via the injection point P at the high speed to mold the secondary molded member 13 portion on the inner peripheral surface of the large-diameter side end portion 3 of the primary molded member. It is to be noted that, as described above, the injected thermoplastic resin is, for example, at 260° C. or more, but this is not especially limited, and may be appropriately designed/changed in such a range that any defect is not generated in the material.

Moreover, the steps for molding the secondary molded member 13 portion include the following steps 1 to 3.

(Step 1)

Figure 7:
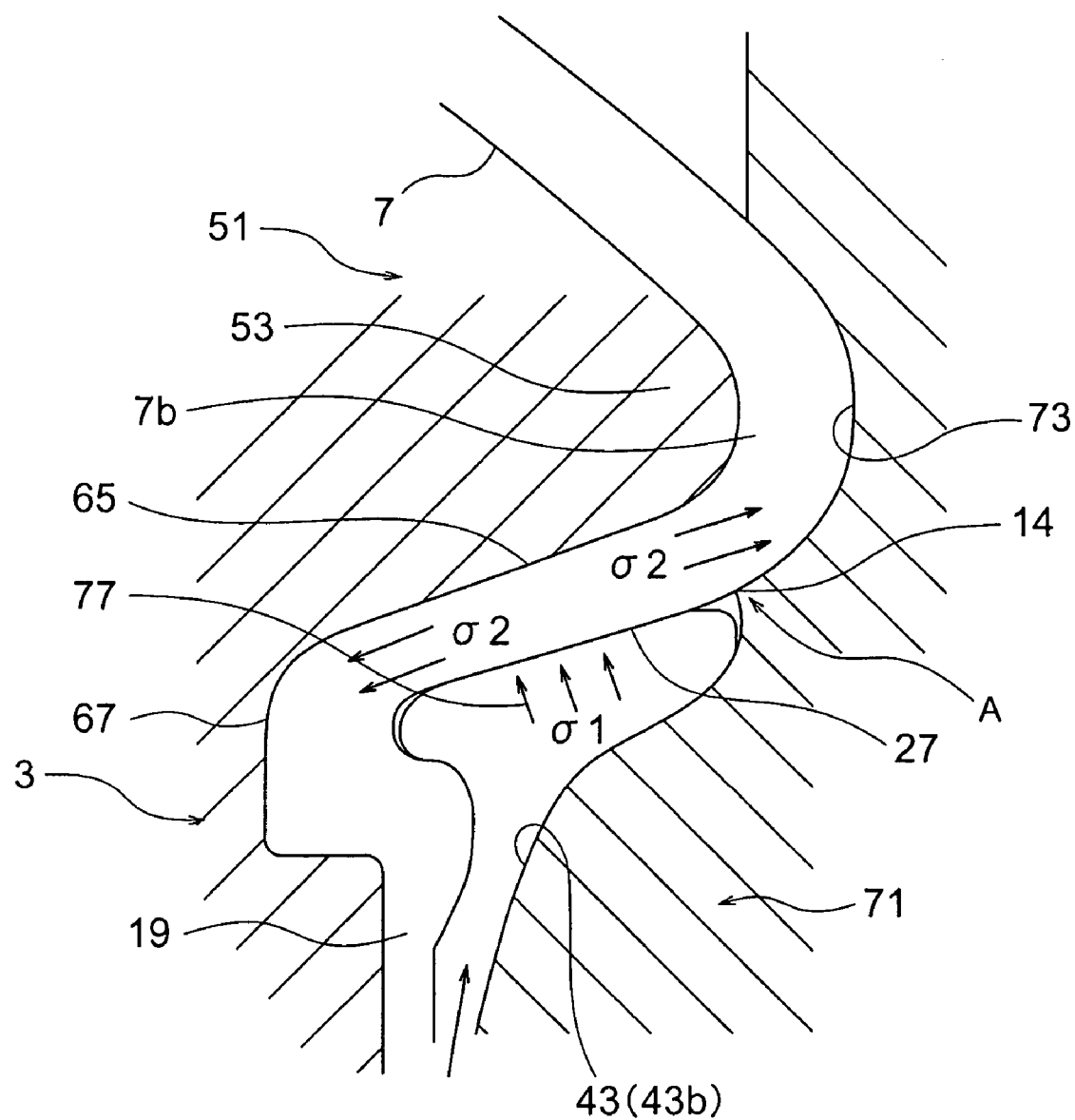
FIG. 7 is a schematic diagram showing that a secondary molding material is injected into a secondary molding space in a manufacturing method and apparatus for the boot for the constant-velocity universal joint of the present embodiment.

As shown in FIG. 7, a pressure of the molten material injected into the secondary molding space 43 is applied to the tapered surface 27 extending toward the large-diameter side end portion 3 from the small-diameter portion 7b just in the vicinity of the large-diameter side end portion 3 in the primary molded member held between the inner peripheral surface of the protrusion 53 of the divided mold 51 and the concave peripheral groove 73 of the outer peripheral surface of the tip of the core mold 69.

(Step 2)

The tapered surface 27 compressed by the injection pressure of the molten material is expanded toward the small-diameter portion 7b.

(Step 3)

When the tapered surface 27 is expanded, the small-diameter portion 7b held between the inner peripheral surface of the protrusion 53 of the mold 49 and the outer peripheral surface of the concave peripheral groove 73 of the core mold 69 is pressure-contacted to the outer peripheral surface of the concave peripheral groove 73 of the core mold 69.

As described above, the steps for molding the secondary molded member 13 portion include Steps 1 to 3. Therefore, when the secondary molding material is injected into the secondary molding space 43, the secondary molding material does not easily leak from the sealed portion A between the inner surface of the small-diameter portion 7b just in the vicinity of the large-diameter side end portion 3 in the primary molded member and the concave peripheral groove 73 of the tip outer peripheral surface of the core mold 69. The present inventors consider that this is achieved by the following principle.

FIG. 7 is a diagram showing that the secondary molding material is injected into the secondary molding space 43 in the manufacturing method and apparatus for the boot for the constant-velocity universal joint of the present example.

As shown in FIG. 7, a flow-direction front end portion (the front end portion of the resin is shown by arrows 77) of the molten resin as the secondary molding material which has flowed into the secondary molding space 43 reaches the tapered surface 27 extending to the large-diameter side end portion 3 from the small-diameter portion 7b just in the vicinity of the large-diameter side end portion 3 in the bellows portion 7.

Moreover, the molten resin functions to pressurize the tapered surface 27 by the injection pressure, and it is recognized that a stress σ1 shown in FIG. 7 is accordingly generated (Step 2 described above).

In this case, since a surface portion 65 of the divided mold 51 exists on the outer surface side of the tapered surface 27, the material of the pressed primary molded member is pressurized, and tries to expand to the outside in a direction intersecting with the stress σ1, that is, along the tapered surface 27.

It is recognized that a stress σ2 shown in FIG. 7 is accordingly generated (Step 2 described above).

However, in a direction in which the stress σ2 is applied, a surface portion 67 of the divided mold 51 abutting on the outer peripheral surface of the large-diameter side end portion 3, and the concave peripheral groove 73 of the outer periphery just in the vicinity of the tip of the core mold 69 exist. In either case, a so-called dead end is generated.

Therefore, the primary molding material existing between both surface portions 67, 73 is in a so-called stretching state, and presses both of the surface portions.

Therefore, an adhesion between the inner surface of the small-diameter portion 7b of the bellows portion 7 and the concave peripheral groove 73 of the outer periphery just in the vicinity of the tip of the core mold 69 is enhanced. It is considered that a so-called self-sealing effect is produced against leakage of the secondary molding material between the small-diameter portion 7b inner surface and the concave peripheral groove 73 (Step 3 described above).

Moreover, when conditions of injection of the thermoplastic resin into the secondary molding space 43 are set as follows, the primary molded member is more firmly fusion-bonded to the secondary molded member.

That is, as shown in FIG. 6, a direction θ of the injection gate 47 is set under conditions of $0° \leq \theta \leq 90°$ with respect to the inner surface of the large-diameter side end portion 3. Moreover, assuming that a distance between the inner surface of the outer peripheral surface 15 of the large-diameter side end portion 3 and the injection gate 47 is t and that a diametric direction distance of an injection-side end portion 41 of the secondary molding space 43 is a, position conditions of the injection gate 47 are set to $0 \leq t \leq 2a/3$.

Accordingly, the thermoplastic resin is injected at the high temperature to sliding-contact the inner surface of the outer peripheral surface 15 of the large-diameter side end portion 3 at the high speed, and is charged into the secondary molding space 43.

At this time, since the thermoplastic resin injected at the high temperature flows into the space in sliding contact with the inner periphery of the outer peripheral surface 15 of the large-diameter side end portion 3, impurities of the material for the primary molding, attached to the inner peripheral surface of the outer peripheral surface 15 are pushed away. Moreover, the heat of the thermoplastic resin which has flown at the high temperature/speed is transferred to the inner peripheral surface to melt the surface.

Therefore, the injected thermoplastic resin is firmly fusion-bonded to the surface of the primary molding material molten by the heat of the thermoplastic resin, and the secondary molded member 13 is molded integrally on the inner peripheral surface side of the large-diameter side end portion 3.

Moreover, according to the present example, the whole inner surface of the small-diameter portion 7b just in the vicinity of the large-diameter side end portion 3 of the bellows portion 7 is fitted into the concave peripheral groove 73 of the core portion 71, and the above-described secondary molded member is molded. Since this step is used, as shown in FIG. 7, the sealed portion A can be shifted toward the large-diameter side end portion 3. Therefore, flexibility for bending the small-diameter portion 7b just in the vicinity of the large-diameter side end portion 3 of the bellows portion 7 can be increased. Therefore, while maintaining a bending angle and flexibility of the whole bellows portion 7, the number of stages in which the large-diameter portions 7a and small-diameter portions 7b are alternately disposed can be reduced, and the bellows portion 7 and the whole boot 1 can be compact.

Moreover, when at least one or more of the convex and concave portions are simultaneously formed on the inner periphery of the large-diameter side end portion 3 of the bellows portion 7 as described above at the primary molding time, the fusion-bonding to the secondary molded member 13 constituting the portion having different thicknesses becomes firm.

For example, in the present example, as shown in FIGS. 3 and 4, a plurality of concave portions 33 and convex portions 35 continuing in the peripheral direction are alternately disposed in a height direction of the inner surface of the large-diameter side end portion 3. Therefore, a fusion-bonding area of the large-diameter side end portion 3 inner surface constituting the primary molded member and the portion having different thicknesses which is the secondary molded member 13 is broadened, and they are firmly fusion-bonded. It is to be noted that in the present example a plurality of concave portions 33 and convex portions 35 are disposed, but the interpretation is not limited to this as long as the fusion-bonding is strengthened as described above. For example, one or a plurality of individual protrusions or dents may also be disposed. In this case, the length of the protrusion can be optionally set.

Furthermore, as shown in FIGS. 3 and 4, when the convex portions 35 extending in the peripheral direction are formed on the inner surface of the large-diameter side end portion 3 of the bellows portion 7, the convex portions 35 function as weirs, and allow the thermoplastic resin injected into the thin portion molding space 43b from the gate 47 to uniformly flow into the thick portion molding space 43a from the thin portion molding space 43b. That is, when the convex portions 35 functioning also as the weirs are formed, the thermoplastic resin injected into the thin portion molding space 43b at the high speed/temperature first flows toward the thick portion molding space 43a along a fluid space between the gate 47 and the convex portion 35 (fluid space above the convex portion 35). Subsequently, the resin flows into a fluid space under the convex portion 35, and flows along the fluid space in a tracing manner. Moreover, the thermoplastic resins which have flown along the respective fluid spaces simultaneously reach the thick portion molding space 43a. The height/length of the convex portion 35 is preferably adjusted in such a manner that the thermoplastic resins which have flows through a plurality of fluid spaces in this manner can simultaneously reach the thick portion molding space 43a.

It is to be noted that the convex portion 35 may be formed on the inner surface of the large-diameter side end portion 3 facing at least the thin portion molding space 43b. The convex portion 35 may be optionally disposed in the present invention, and the number of convex portions may also be appropriately changed.

EXAMPLE 2

Figure 8:
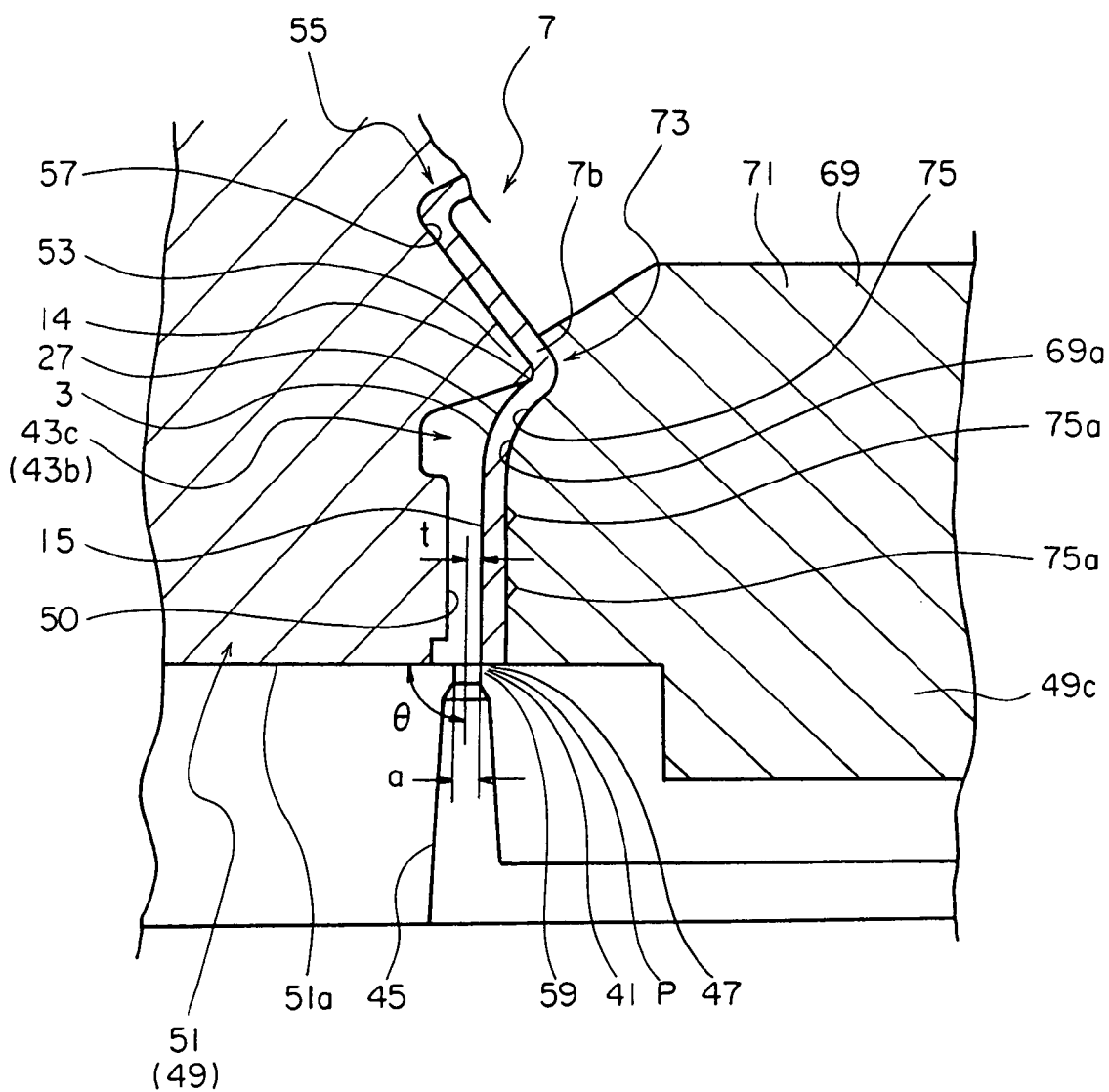
FIG. 8 is a schematic diagram of Example 2.
Figure 9:
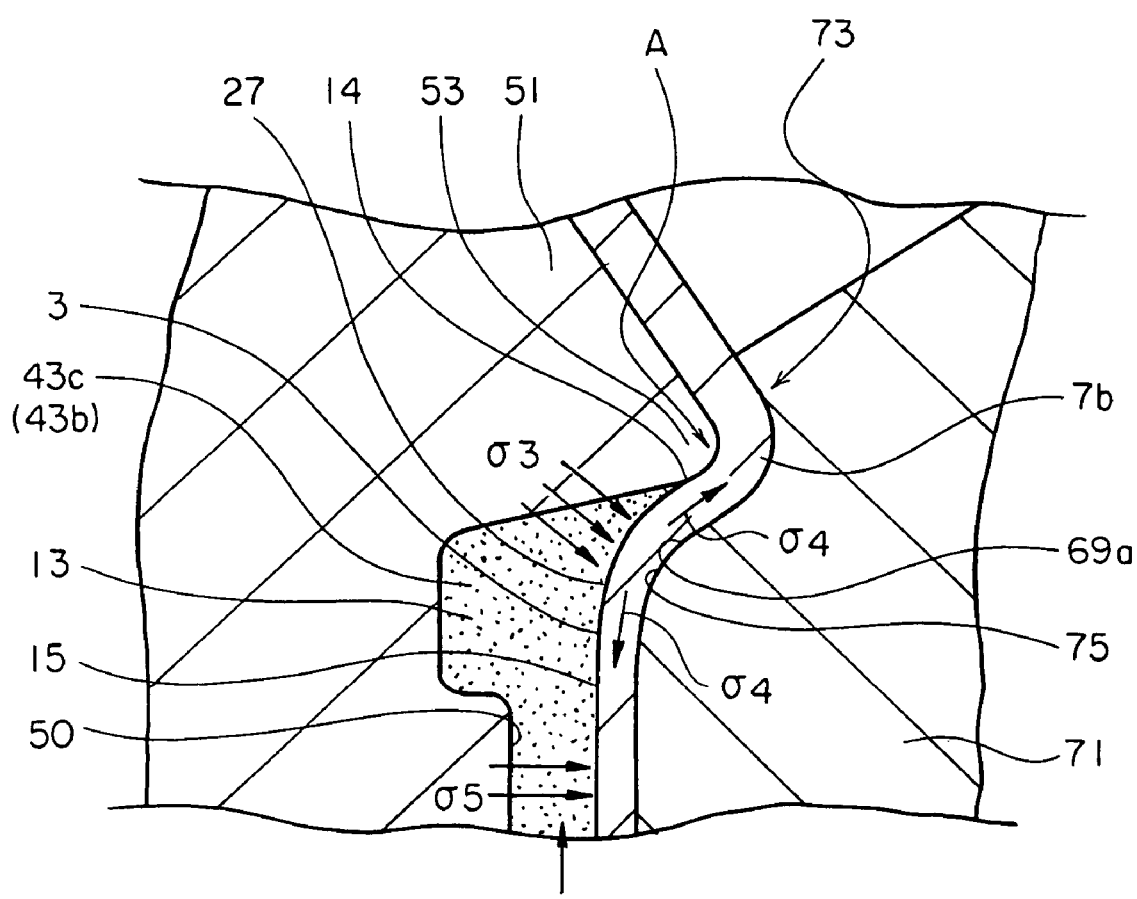
FIG. 9 is a diagram showing a stress applied onto a tapered surface of the large-diameter side end portion at a time when a molten material is injected into the secondary molding space.

FIGS. 8 and 9 show another example of the secondary molding step. It is to be noted that in the present example, as described later, only the formed place of the secondary molding space 43a, the injection position of the molten material and the like differ. The description of Example 1 applies to constitutions and functions/effects other than those described hereinafter, and description is omitted.

[Primary Molding Step]

The basic constitution, molding method and the like of the primary molded member of the present example are similar to those of Example 1, but the large-diameter side end portion 3 is formed in a cylindrical shape having a straight sectional thickness. It is to be noted that unlike the present example, to enhance the adhesion to the secondary molded member, the outer peripheral surface 15 of the large-diameter side end portion 3 may also be formed in a coarse surface (concave/convex surface). It is to be noted that at least one or more of the convex and concave portions are simultaneously formed on the outer peripheral surface 15 of the large-diameter side end portion of the bellows portion 7 which is the primary molded member at the primary molding time in the same manner as in the large-diameter side end portion inner peripheral surface of Example 1. Then, the fusion-bonding to the portion having different thicknesses which is the secondary molded member 13 is strengthened in the same manner as in Example 1. When the convex portions are disposed, the function/effect of the convex portion operating also as the weir is produced in the same manner as in Example 1, and detailed description is omitted.

[Secondary Molding Step]

In the present example, a secondary molding space 43c (43a, 43b) for the primary molding is formed between the outer peripheral surface 15 of the large-diameter side end portion 3 of the primary molded member disposed between the divided mold 51 and the core mold 69 and the inner peripheral surface of the divided mold 51 (mold inner peripheral surface 50), and the molten material is injected into the secondary molding space 43c to mold the large-diameter side end portion including the portion having different thicknesses.

First, a schematic structure of the mold 49 which is the main part of the manufacturing apparatus for use in the step of the present example will be described. As shown in FIG. 8, the mold 49 for the injection molding which is the main part of the present apparatus includes divided molds 51 constituting a movable board 49a side, and a core mold 69 disposed on a fixed board 49b side.

As shown in FIG. 8, an outline 57 to mold the large-diameter side end portion outer shape is formed on the inner surfaces of the divided molds 51. It is to be noted that the outer shape of the large-diameter side end portion is not especially limited, and may be designed/changed in the scope of the present invention.

The core mold 69 is constituted of a substantially cylindrical core portion 71 to be fitted into the inner peripheral surface of the large-diameter side end portion 3 in the primary molded member, and a fixed portion 49c extended to the lower end of the core portion 71 and fixed onto the fixed board 49b.

In the core portion 71, a concave peripheral groove 73 is formed in the outer periphery just in the vicinity of one end opposite to the fixed portion 49c in the core portion axial direction.

Moreover, in an outer peripheral portion 75 between the fixed portion 49c and the concave peripheral groove 73 in the core portion 71, a portion is formed whose outer peripheral shape and outer diameter are determined in consideration of the outer peripheral shape and outer diameter of the casing of the tripod joint to which the boot 1 manufactured by the present example is attached.

Moreover, the outer peripheral portion 75 is provided with two sealing lip forming concave portions 75a, 75a disposed in the axial direction for transferring/molding the sealing lips 21 (21a, 21b) disposed on the inner peripheral surface of the large-diameter side end portion 3 of the boot 1 in a secondary molding stage.

In the fixed board 49b, a gate 47 is formed from which the thermoplastic resin is injected into the secondary molding space 43 described later via a runner 45. In the present example, for example, as shown in FIG. 8, the gate 47 is disposed in one or a plurality of optionally selected places of a thin portion molding space 43b.

That is, when a thermoplastic resin injection point P for the secondary molding is disposed in one or a plurality of optional places of the thin portion molding space 43b in the secondary molding space 43, the thin portion molding space 43b from the injection gate 47 to a thick portion molding space 43a also serves as a narrow runner. While a high-temperature state is maintained, the molten material is momentarily fed into the thick portion molding space 43a at a high speed/temperature, and therefore the air defect, welding defect and the like can be prevented from being caused.

Next, an example of the present step performed using the above-described mold 49 will be described. For example, first the inner peripheral surface of the large-diameter side end portion 3 of the primary molded member is fitted into the outer peripheral surface of the core portion 71 of the core mold 69 disposed beforehand on the fixed board 49b side of the mold 49 to attach the primary molded member to the core mold 69.

Moreover, next the primary molded member including the large-diameter side end portion 3 fitted into the outer peripheral surface of the core mold 69 as described above is disposed/held in the mold 49, when the divided molds 51 are clamped.

When the divided molds 51 are clamped in this manner, as shown in FIG. 9, a protrusion 53 of the inner surface of the divided mold 51 fits into the whole outer surface of the small-diameter portion 7b just in the vicinity of the large-diameter side end portion 3 of the bellows portion 7. The concave peripheral groove 73 formed in the concave shape in the outer peripheral surface of the tip of the core portion 71 of the core mold 69 fits into the whole inner surface of the small-diameter portion 7*b*, and the small-diameter portion 7*b* is held between the protrusion 53 of the divided mold 51 and the concave peripheral groove 73 of the core mold 69.

Through this step, as shown in FIG. 9, the sealed portion A is formed in the held portion of the small-diameter portion 7*b*, and the secondary molding space 43*c* for molding the secondary molded member 13 constituted of the thick portions 17 and thin portions 19 on the outer peripheral surface 15 of the large-diameter side end portion 3 is formed between the outer peripheral surface 15 of the large-diameter side end portion 3 of the primary molded member and the inner peripheral surface (mold inner peripheral surface 50) of the divided mold 51.

Moreover, the steps of the present example include the following steps 1 to 3.

(Step 1)

As shown in FIG. 9, when the molten material is injected into the secondary molding space 43*c*, the injection pressure of the injected molten material is applied to the tapered surface 27 extending toward the large-diameter side end portion 3 from the small-diameter portion 7*b* just in the vicinity of the large-diameter side end portion 3 in the primary molded member held between the inner peripheral surface of the protrusion 53 of the divided mold 51 and the concave peripheral groove 73 of the outer peripheral surface of the tip of the core mold 69.

(Step 2)

The tapered surface 27 compressed by the injection pressure of the molten material is expanded toward the small-diameter portion 7*b*.

(Step 3)

When the tapered surface 27 is expanded, the small-diameter portion 7*b* held between the inner peripheral surface of the protrusion 53 of the divided mold 51 and the outer peripheral surface of the concave peripheral groove 73 of the core mold 69 is pressure-contacted to the inner peripheral surface of the protrusion 53 of the divided mold 51.

On the other hand, the cylindrical portion (straight portion) of the large-diameter side end portion to which the injection pressure (stress σ5 shown in FIG. 9) is applied is heated, softened, and pressure-contacted to the outer peripheral surface (outer peripheral portion 75) of the core mold 69. A part of the material enters the sealing lip forming concave portions 75*a*, 75*a* of the core mold outer peripheral surface (outer peripheral portion 75) to transfer two annular sealing lips 21 (21*a*, 21*b*) disposed in the axial direction onto the inner periphery of the large-diameter side end portion.

As described above, the steps for molding the secondary molded member 13 portion include Steps 1 to 3. Therefore, when the secondary molding material is injected into the secondary molding space 43*c*, the secondary molding material does not easily leak from the sealed portion A between the outer surface of the small-diameter portion 7*b* just in the vicinity of the large-diameter side end portion 3 in the primary molded member and the inner peripheral surface of the protrusion 53 of the divided mold 51.

As shown in FIG. 9, a flow-direction front end portion of the molten resin as the secondary molding material which has flown into the secondary molding space 43*c* reaches the tapered surface 27 extending to the large-diameter side end portion 3 from the small-diameter portion 7*b* just in the vicinity of the large-diameter side end portion 3 in the bellows portion 7.

Moreover, the molten resin functions to pressurize the tapered surface 27 by the injection pressure, and it is recognized that a stress σ3 shown in FIG. 9 is accordingly generated (Step 1 described above).

In this case, since a surface portion 69*a* of the core mold 69 exists on the inner surface side of the tapered surface 27, the material of the pressed primary molded member is pressurized, and tries to expand to the outside in a direction intersecting with the stress σ3, that is, along the tapered surface 27.

It is recognized that stresses σ4 shown in FIG. 9 are accordingly generated (Step 2 described above).

However, in directions in which the stresses σ4 are applied, an end surface 49*d* of the fixed board 49*b* and the protrusion 53 of the inner surface of the divided mold 51 exist. Therefore, the primary molding material existing between both portions 49*d*, 53 is in a so-called stretching state, and is considered to press both portions 49*d*, 53.

Therefore, an adhesion between the outer surface of the small-diameter portion 7*b* of the bellows portion 7 and the protrusion 53 of the inner surface of the divided mold 51 is enhanced. It is considered that a so-called self-sealing effect is produced against leakage of the secondary molding material between the outer surface of the small-diameter portion 7*b* and the protrusion 53 of the inner surface of the divided mold 51 (Step 3 described above).

Moreover, when conditions of injection of the thermoplastic resin into the secondary molding space 43*c* are set as follows, the primary molded member is more firmly fusion-bonded to the secondary molded member.

That is, as shown in FIG. 8, a direction θ of the injection gate 47 is set under conditions of $0° \leq \theta \leq 90°$ with respect to the outer peripheral surface 15 of the large-diameter side end portion 3. Moreover, assuming that a distance between the outer peripheral surface 15 of the large-diameter side end portion 3 and the injection gate 47 is t and that a diametric direction distance of an injection-side end portion 41 of the secondary molding space 43*c* is a, position conditions of the injection gate 47 are set to $0 \leq t \leq 2a/3$.

Accordingly, the thermoplastic resin is injected at the high temperature to sliding-contact the outer peripheral surface 15 of the large-diameter side end portion 3 at the high speed, and is charged into the secondary molding space 43*c*.

At this time, since the thermoplastic resin injected at the high temperature flows into the space in sliding contact with the outer peripheral surface 15 of the large-diameter side end portion 3, impurities of the material for the primary molding, attached to the front surface of the outer peripheral surface 15, are pushed away. Moreover, the heat of the thermoplastic resin which has flown at the high temperature/speed is transferred to the outer peripheral surface 15 to melt the outer peripheral surface 15.

Therefore, the injected thermoplastic resin is firmly fusion-bonded to the surface of the primary molding material molten by the heat of the thermoplastic resin, and the secondary molded member 13 is molded integrally between the outer peripheral surface 15 of the large-diameter side end portion 3 and the inner peripheral surface of the divided mold 51 (mold inner peripheral surface 50).

[Modification]

Figure 10:
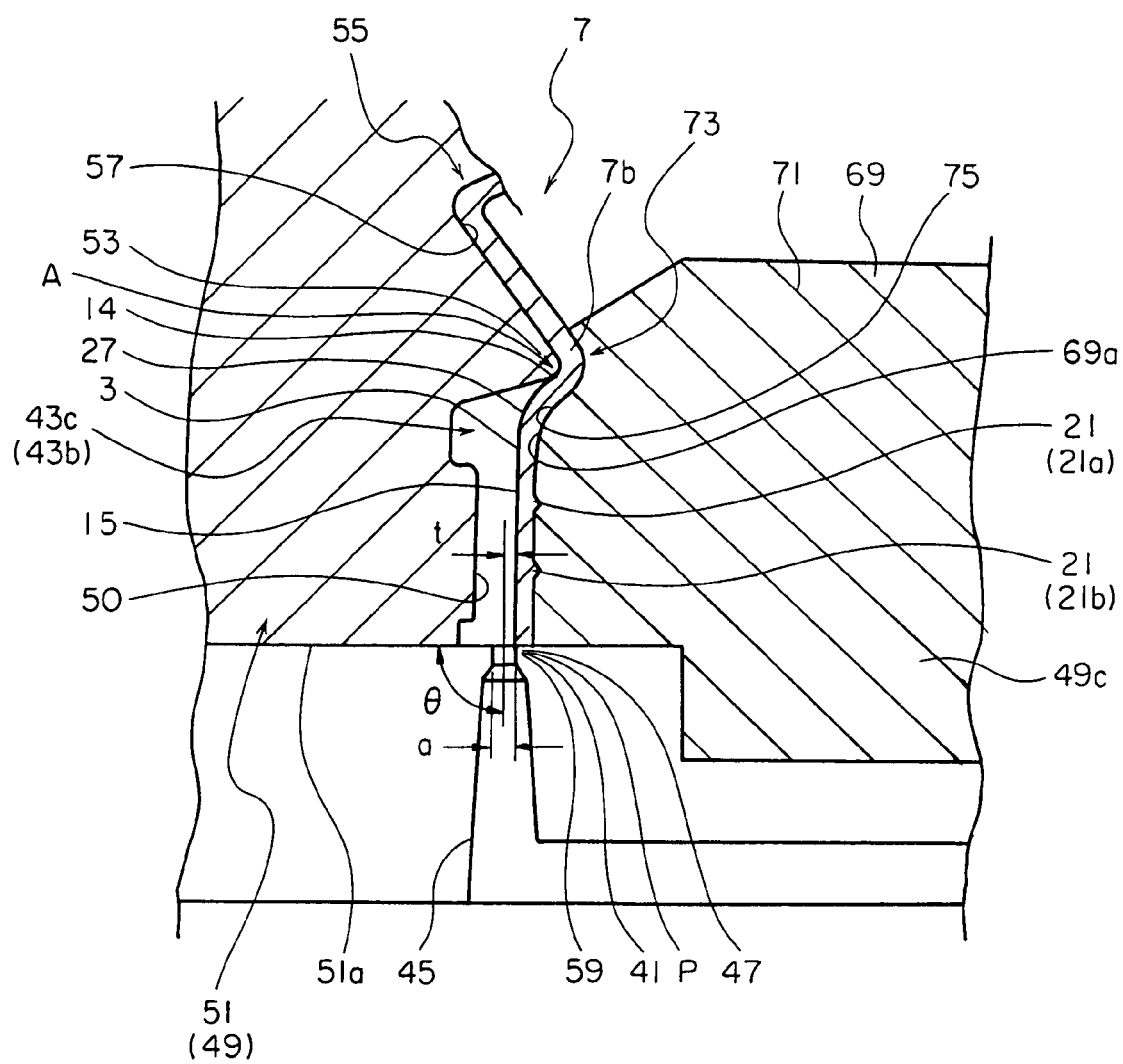
FIG. 10 is a schematic diagram showing a modification of Example 2.

A modification of Example 2 shown in FIG. 8 is shown in FIG. 10. In the present modification, at the molding time of the primary molded member, the inner peripheral surface of the large-diameter side end portion 3 is molded beforehand in a shape matching the outer peripheral portion 75 of the core mold 69, and the large-diameter side end portion including the portion having different thicknesses is molded by the steps of Example 2.

Since the other constitutions and functions/effects are similar to those of Example 2 described with reference to FIGS. 8, 9, the detailed description is omitted.

It is to be noted that the gate 47 is disposed in the thick portion molding space 43a so that the thermoplastic resin may be injected only from the thick portion molding space 43a or a plurality of places including the thick portion molding space 43a. However, from the standpoints of prevention of occurrence of the air defect and welding defect, the thin portion molding space 43b is preferably provided with the gate 47 as in the present example.

EXAMPLE 3

Figure 11:
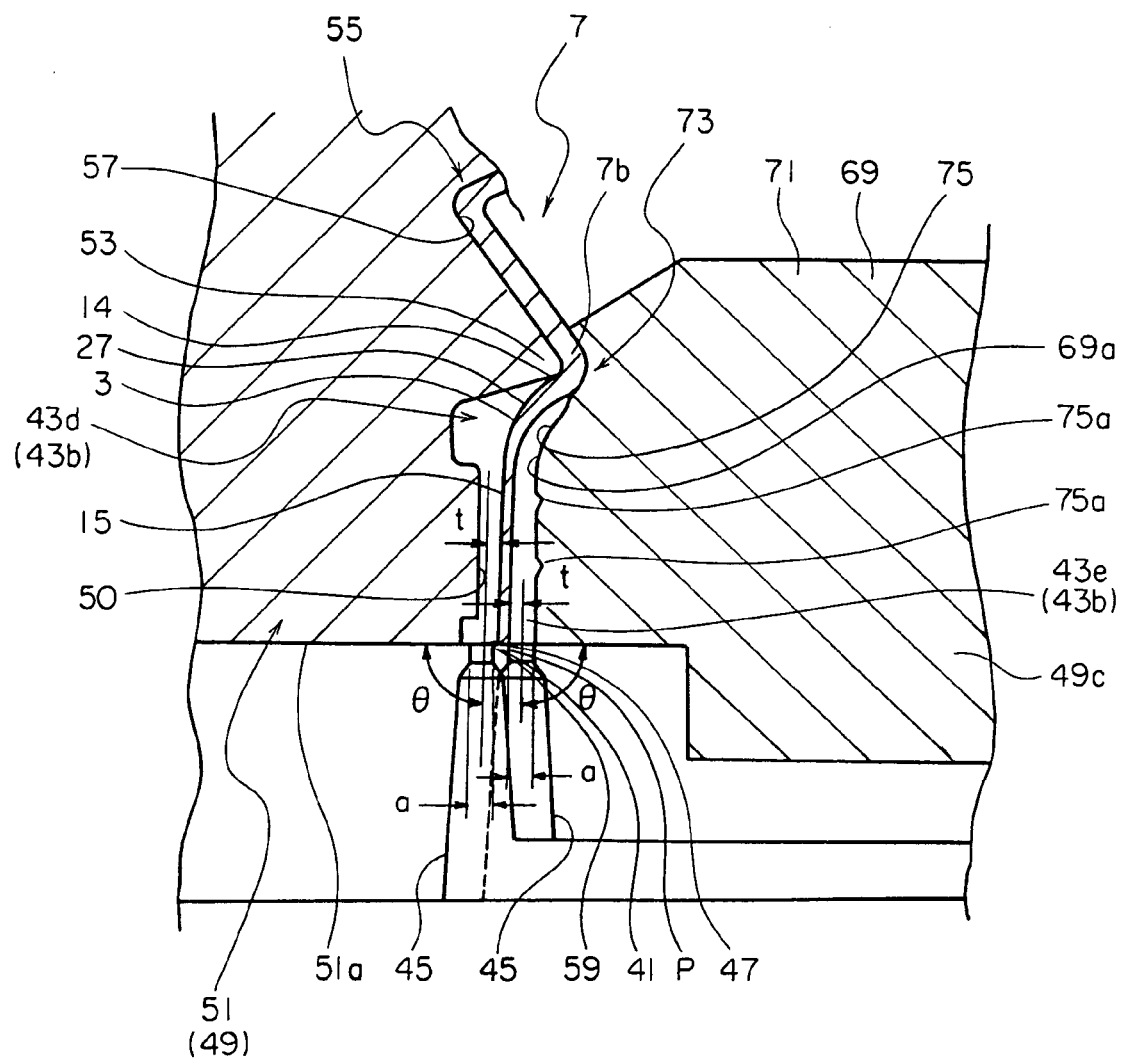
FIG. 11 is a schematic diagram of Example 3.
Figure 12:
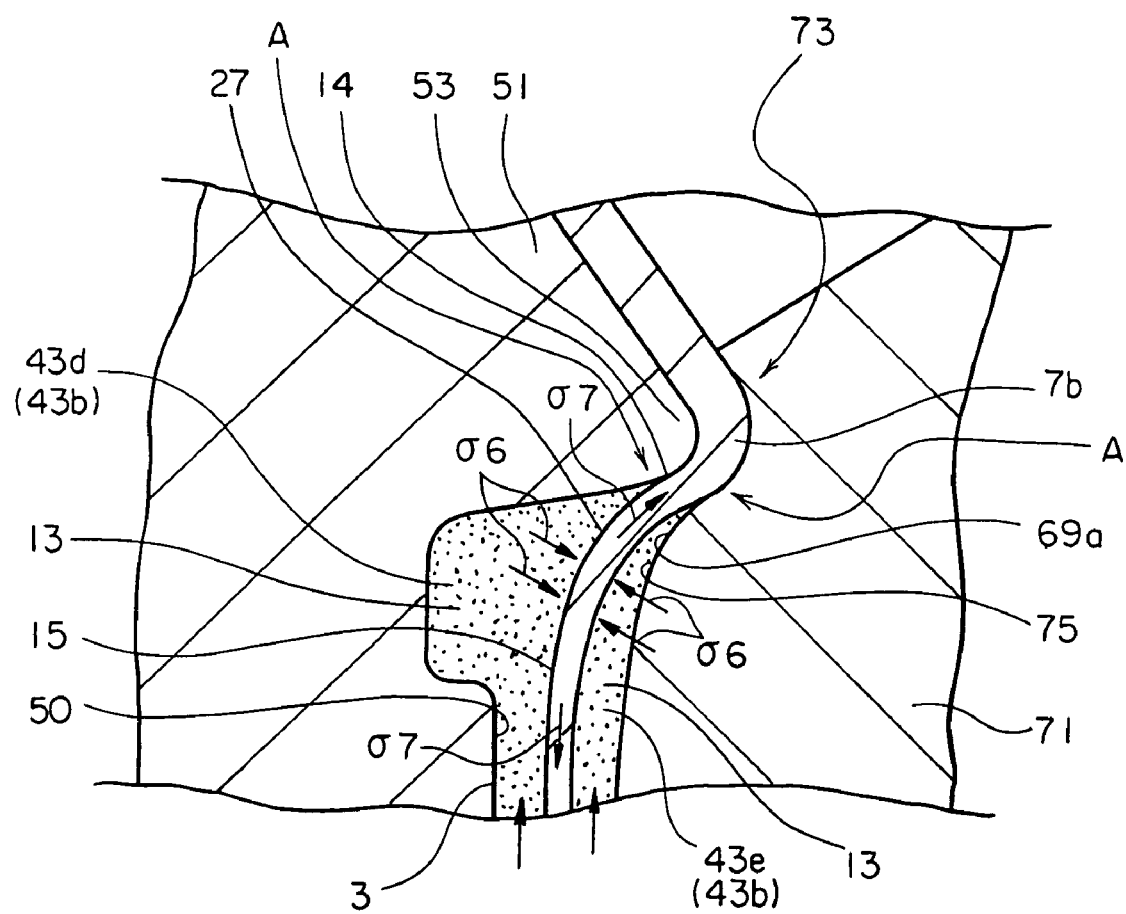
FIG. 12 is a diagram showing the stress applied onto the tapered surface of the large-diameter side end portion at a time when the molten material is injected into the secondary molding space.

FIGS. 11 and 12 show another example of the secondary molding step. It is to be noted that in the present example, as described later, only the formed places of the secondary molding spaces 43d, 43e, the injection position of the molten material and the like differ. The descriptions of Examples 1 and 2 apply to constitutions and functions/effects other than those described hereinafter, and description is omitted. Since the primary molding step is similar to that of Example 2, the secondary molding step will be described.

[Secondary Molding Step]

In the present example, secondary molding spaces 43d, 43e are formed between the core mold outer peripheral surface (outer peripheral portion 75) and the mold inner peripheral surface 50 via the inner/outer peripheral surface of the large-diameter side end portion 3, and the molten material is injected into the secondary molding spaces 43d, 43e to integrally mold the portion having different thicknesses which is the secondary molded member. The constitutions of the mold 49 and core mold 69 and the like are similar to those of Example 2.

That is, in the present example, the large-diameter side end portion 3 of the primary molded member is positioned apart from the inner peripheral surface of the divided mold 51 (mold inner peripheral surface 50) and the outer peripheral surface of the core mold 69 (outer peripheral portion 75) between the inner peripheral surface of the divided mold 51 (mold inner peripheral surface 50) and the outer peripheral surface of the core mold 69 (outer peripheral portion 75).

Moreover, the injection gates 47 are positioned facing the secondary molding space 43d formed between the divided mold inner peripheral surface (mold inner peripheral surface 50) and the large-diameter side end portion outer peripheral surface 15, and the secondary molding space 43e formed between the core mold outer peripheral surface and the large-diameter side end portion inner peripheral surface. It is to be noted that the thin portion molding space 43b is shown as an example, but the thick portion molding space 43a is also similar, and therefore the description is omitted.

In the injection conditions by the injection gates 47 of the present example, the description of Example 2 applies to the injection gate disposed facing the secondary molding space 43d, and that of Example 1 applies to the injection gate disposed facing the secondary molding space 43e. It is to be noted that injection amount/pressure of the molten material injected into the secondary molding spaces 43d, 43e may be appropriately designed/changed.

Moreover, the steps of the present example include the following steps 1 to 3.

(Step 1)

As shown in FIG. 12, when the molten material is injected into the secondary molding spaces 43d, 43e, the injection pressure of the injected molten material is applied to the tapered surface 27 extending toward the large-diameter side end portion 3 from the small-diameter portion 7b just in the vicinity of the large-diameter side end portion 3 in the primary molded member held between the inner peripheral surface of the protrusion 53 of the divided mold 51 and the concave peripheral groove 73 of the outer peripheral surface of the tip of the core mold 69 from the outer/inner surface.

(Step 2)

The tapered surface 27 compressed by the injection pressure of the molten material is expanded toward the small-diameter portion 7b.

(Step 3)

When the tapered surface 27 is expanded, the small-diameter portion 7b held between the inner peripheral surface of the protrusion 53 of the mold 49 and the outer peripheral surface of the concave peripheral groove 73 of the core mold 69 is pressure-connected to the inner peripheral surface of the protrusion 53 of the mold 49.

As described above, the steps for molding the secondary molded member 13 portion include Steps 1 to 3. Therefore, when the secondary molding material is injected into the secondary molding spaces 43d, 43e, the secondary molding material does not easily leak from the sealed portions A between the outer surface of the small-diameter portion 7b just in the vicinity of the large-diameter side end portion 3 in the primary molded member and the inner peripheral surface of the protrusion 53 of the mold 49 and between the inner surface of the small-diameter portion 7b and the concave peripheral groove 73 of the outer periphery in the vicinity of the tip of the core mold 69.

As shown in FIG. 12, flow-direction front end portions of the molten resins as the secondary molding materials which have flown into the secondary molding spaces 43d, 43e reach the tapered surface 27 extending to the large-diameter side end portion 3 from the small-diameter portion 7b just in the vicinity of the large-diameter side end portion 3 in the bellows portion 7 from the outer/inner surfaces.

Moreover, the molten resin functions to pressurize the tapered surface 27 by the injection pressure from the outer/inner surface, and it is recognized that a stress σ6 shown in FIG. 12 is accordingly generated (Step 1 described above).

In this case, since the tapered surface 27 is pressurized by stresses σ6, σ6 from the outer/inner surface, the material of the pressed primary molded member is pressurized, and tries to expand to the outside in a direction intersecting with the stress σ6, that is, along the tapered surface 27.

It is recognized that a stress σ7 shown in FIG. 12 is accordingly generated (Step 2 described above).

However, in the direction in which the stress σ7 is applied, an end surface 49d of the fixed board 49b, the protrusion 53 of the inner surface of the divided mold 51, and the concave peripheral groove 73 of the outer periphery just in the vicinity of the tip of the core mold 69 exist. Therefore, the primary molding material existing between both portions 49d and 53 or 73 is in a so-called stretching state, and is considered to press both portions 49d and 53, or 73.

Therefore, an adhesion between the outer surface of the small-diameter portion 7b of the bellows portion 7 and the protrusion 53 of the inner surface of the divided mold 51, and that between the outer surface of the small-diameter portion 7b and the concave peripheral groove 73 of the outer periphery just in the vicinity of the tip of the core mold 69 are enhanced. It is considered that a so-called self-sealing effect is produced against leakage of the secondary molding material between the outer surface of the small-diameter portion 7b and the protrusion 53 of the inner surface of the divided mold 51 and between the outer surface of the small-diameter portion 7b and the concave peripheral groove 73 of the outer periphery just in the vicinity of the tip of the core mold 69 (Step 3 described above).

It is to be noted that the gate 47 is disposed in the thick portion molding space 43a so that the thermoplastic resin may be injected only from the thick portion molding space 43a or a plurality of places including the thick portion molding space 43a. However, from the standpoints of prevention of occurrence of the air defect and welding defect, the thin portion molding space 43b is preferably provided with the gate 47 as in the present example.

What is claimed is:

1. A method of manufacturing a boot for a constant-velocity universal joint, the boot having a plurality of thick portions adapted to concave portions of a casing of a tripod joint and formed to protrude toward a center direction and a plurality of thin portions formed between adjacent thick portions, the method comprising the steps of:

preparing a primary molded member having a large-diameter side end portion, a small-diameter side end portion, a bellows portion formed between the large-diameter side end portion and the small-diameter side end portion and constituted of repeatedly arranged large-diameter portions and small-diameter portions, and a tapered portion formed between the large-diameter side end portion and the small-diameter portion in a vicinity of the large-diameter side end portion in the bellows portion, holding the small-diameter portion in the vicinity of the large-diameter side end portion between an inner peripheral surface of a mold disposed in an outer peripheral side of the primary molded member and an outer peripheral surface of a core mold disposed in the large-diameter side end portion, forming a secondary molding space constituted of a thick portion molding space molding the thick portion and a thin portion molding space molding the thin portion between a large-diameter side end portion inner peripheral surface of the primary molded member and a core mold outer peripheral surface, injecting a molten material to the secondary molding space; and molding a secondary molded portion constituting the plural thick portions and the plural thin portions on the large-diameter side end portion of the primary molded member, the step of injecting the molten material to the secondary molded portion including the steps of:

a first step for applying a pressure of the molten material injected into the secondary molding space to an inner surface of the tapered portion of the primary molded member;

a second step for expanding the tapered portion compressed in a thickness direction by the pressure of the molten material toward a direction of the small-diameter portion; and a third step for pressure-contacting the small-diameter portion held between the mold inner peripheral surface and the core mold outer peripheral surface onto the core mold outer peripheral surface by the expanding of the tapered portion.

2. The method of manufacturing the boot for the constant-velocity universal joint according to claim 1, wherein the step of molding the secondary molded portion includes the steps of:

setting a direction θ of an injection gate injecting the molten material to $0° \leq \theta \leq 90°$ with respect to the inner peripheral surface of the large-diameter side end portion of the primary molded member;

assuming that a distance between the inner peripheral surface of the large-diameter side end portion of the primary molded member and an injection gate center is t and that a diametric direction distance of an injection-side end portion of the secondary molding space is a; and setting a position of the injection gate to $0 \leq t \leq 2a/3$, injecting the molten material so as to bring the molten material into sliding contact with the inner peripheral surface of the large-diameter side end portion of the primary molded member, and charging the molten material into the secondary molding space.

3. The method of manufacturing the boot for the constant-velocity universal joint according to claim 1, wherein the molten material is injected from the thick portion molding space.

4. The method of manufacturing the boot for the constant-velocity universal joint according to claim 1, wherein the mold has a protrusion in the inner peripheral surface thereof, the core mold has a concave peripheral groove in the outer peripheral surface thereof, the small-diameter portion is held between the protrusion of the mold and the concave peripheral groove of the core mold outer peripheral surface.

5. The method of manufacturing the boot for the constant-velocity universal joint according to claim 1, further comprising the steps of:

inserting and disposing one or two pins at an interval in the thick portion molding space in the secondary molding space; and thereafter injecting the molten material to form one or two holes in the thick portion.

6. A method of manufacturing a boot for a constant-velocity universal joint, the boot having a plurality of thick portions adapted to concave portions of a casing of a tripod joint and formed to protrude toward a center direction and a plurality of thin portions formed between adjacent thick portions, the method comprising the step of:

preparing a primary molded member having a large-diameter side end portion, a small-diameter side end portion, a bellows portion formed between the large-diameter side end portion and the small-diameter side end portion and constituted of repeatedly arranged large-diameter portions and small-diameter portions, and a tapered portion formed between the large-diameter side end portion and the small-diameter portion in a vicinity of the large-diameter side end portion in the bellows portion, holding the small-diameter portion in the vicinity of the large-diameter side end portion between an inner peripheral surface of a mold disposed in an outer peripheral side of the primary molded member and an outer peripheral surface of a core mold disposed in the large-diameter side end portion, forming a secondary molding space constituted of a thick portion molding space molding the thick portion and a thin portion molding space molding the thin portion between the inner peripheral surface of the mold and the large-diameter side end portion outer peripheral surface of the primary molded member; and injecting a molten material to the secondary molding space; and molding a secondary molded portion constituting the plural thick portions and the plural thin portions on the large-diameter side end portion of the primary molded member, the step of injecting the molten material to the secondary molded portion including the steps of:

a first step for applying a pressure of the molten material injected into the secondary molding space to an outer surface of the tapered portion of the primary molded member;

a second step for expanding the tapered portion compressed in a thickness direction by the pressure of the molten material toward a direction of the small-diameter portion; and a third step for pressure-contacting the small-diameter portion held between the mold inner peripheral surface and the core mold outer peripheral surface onto the mold inner peripheral surface by the expanding of the tapered portion.

7. The method of manufacturing the boot for the constant-velocity universal joint according to claim 6, wherein the step of molding the secondary molded portion includes the steps of:

setting a direction θ of an injection gate injecting the molten material to $0° \leq θ \leq 90°$ with respect to the outer peripheral surface of the large-diameter side end portion of the primary molded member;

assuming that a distance between the outer peripheral surface of the large-diameter side end portion of the primary molded member and an injection gate center is t and that a diametric direction distance of an injection-side end portion of the secondary molding space is a; and setting a position of the injection gate to $0 \leq t \leq 2a/3$, injecting the molten material so as to bring the molten material into sliding contact with the outer peripheral surface of the large-diameter side end portion of the primary molded member, and charging the molten material into the secondary molding space.

8. The method of manufacturing the boot for the constant-velocity universal joint according to claim 6, wherein the molten material is injected from the thick portion molding space.

9. The method of manufacturing the boot for the constant-velocity universal joint according to claim 6, wherein the mold has a protrusion in the inner peripheral surface thereof, the core mold has a concave peripheral groove in the outer peripheral surface thereof the small-diameter portion is held between the protrusion of the mold and the concave peripheral groove of the core mold outer peripheral surface.

10. The method of manufacturing the boot for the constant-velocity universal joint according to claim 6, further comprising the steps of:

inserting and disposing one or two pins at an interval in the thick portion molding space in the secondary molding space; and thereafter injecting the molten material to form one or two holes in the thick portion.

11. A method of manufacturing a boot for a constant-velocity universal joint, the boot having a plurality of thick portions adapted to concave portions of a casing of the tripod joint and formed to protrude toward a center direction and a plurality of thin portions formed between adjacent thick portions, the method comprising the step of:

preparing a primary molded member having a large-diameter side end portion, a small-diameter side end portion, a bellows portion formed between the large-diameter side end portion and the small-diameter side end portion and constituted of repeatedly arranged large-diameter portions and small-diameter portions, and a tapered portion formed between the large-diameter side end portion and the small-diameter portion in a vicinity of the large-diameter side end portion in the bellows portion, holding the small-diameter portion in the vicinity of the large-diameter side end portion between an inner peripheral surface of a mold disposed in an outer peripheral side of the primary molded member and an outer peripheral surface of a core mold disposed in the large-diameter side end portion, forming a secondary molding space constituted of a thick portion molding space molding the thick portion and a thin portion molding space molding the thin portion between the core mold outer peripheral surface and the mold inner peripheral surface via an inner peripheral surface and an outer peripheral surface of the large-diameter side end portion of the primary molded member, injecting a molten material to the secondary molding space; and molding a secondary molded portion constituting the plural thick portions and the plural thin portions on the large-diameter side end portion of the primary molded member, the step of injecting the molten material to the secondary molded portion including the steps of:

a first step for applying a pressure of the molten material injected into the secondary molding space to an inner surface and an outer surface of the tapered portion of the primary molded member;

a second step for expanding the tapered portion compressed in a thickness direction by the pressure of the molten material toward a direction of the small-diameter portion; and a third step for pressure-contacting the small-diameter portion held between the mold inner peripheral surface and the core mold outer peripheral surface onto both of the core mold outer peripheral surface and the mold inner peripheral surface by the expanding of the tapered portion.

12. The method of manufacturing the boot for the constant-velocity universal joint according to claim 11, wherein the step of molding the secondary molded portion includes the steps of:

assuming that the injection gate for injecting a molten material to the secondary molded space of the inner peripheral surface side of the large-diameter side end portion of the primary molded member is a first injection gate and that the injection gate for injecting a molten material to the secondary molded space of the outer peripheral surface side of the large-diameter side end portion of the primary molded member is a second injection gate, setting a direction θ of the first injection gate to $0 \leq θ \leq 90°$ with respect to the inner peripheral surface of the large-diameter side end portion of the primary molded member;

assuming that a distance between the inner peripheral surface of the large-diameter side end portion of the primary molded member and the first injection gate center is t and that a diametric direction distance of an injection-side end portion of the secondary molding space is a;

setting a position of the first injection gate to $0 \leq t \leq 2a/3$, injecting the molten material so as to bring the molten material into sliding contact with the inner peripheral surface of the large-diameter side end portion of the primary molded member, and charging the molten material into the secondary molding space;

setting a direction θ of the second injection gate to 0°<θ<90° with respect to the outer peripheral surface of the large-diameter side end portion of the primary molded member; and assuming that a distance between the outer peripheral surface of the large-diameter side end portion of the primary molded member and the second injection gate center is t and that a diametric direction distance of an injection-side end portion of the secondary molding space is a;

setting a position of the second injection gate to 0<t<2a/3, injecting the molten material so as to bring the molten material into sliding contact with the outer peripheral surface of the large-diameter side end portion of the primary molded member, and charging the molten material into the secondary molding space.

13. The method of manufacturing the boot for the constant-velocity universal joint according to claim 11, wherein the molten material is injected from the thick portion molding space.

14. The method of manufacturing the boot for the constant-velocity universal joint according to claim 11, wherein the mold has a protrusion in the inner peripheral surface thereof, the core mold has a concave peripheral groove in the outer peripheral surface thereof the small-diameter portion is held between the protrusion of the mold and the concave peripheral groove of the core mold outer peripheral surface.

15. The method of manufacturing the boot for the constant-velocity universal joint according to claim 11, further comprising the steps of:

inserting and disposing one or two pins at an interval in the thick portion molding space in the secondary molding space; and thereafter injecting the molten material to form one or two holes in the thick portion.

* * * * *